US011945235B2

(12) United States Patent
Abe et al.

(10) Patent No.: US 11,945,235 B2
(45) **Date of Patent: *Apr. 2, 2024**

(54) PRINTING APPARATUS AND CONTROL METHOD THEREOF FOR ADJUSTING THE DISTANCE BETWEEN A PRINTHEAD AND A PRINT MEDIUM

(71) Applicant: CANON KABUSHIKI KAISHA, Tokyo (JP)

(72) Inventors: Tomohito Abe, Kanagawa (JP); Daigo Kuronuma, Kanagawa (JP); Ryutaro Takahashi, Tokyo (JP); Naoaki Wada, Kanagawa (JP); Noriyuki Aoki, Tokyo (JP); Ryohei Maruyama, Kanagawa (JP); Masakazu Nagashima, Kanagawa (JP); Toshiaki Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,664

(22) Filed: Dec. 5, 2022

(65) Prior Publication Data

US 2023/0098088 A1 Mar. 30, 2023

Related U.S. Application Data

(63) Continuation of application No. 17/348,283, filed on Jun. 15, 2021, now Pat. No. 11,524,512.

(30) Foreign Application Priority Data

Jun. 19, 2020 (JP) ................................ 2020-106404

(51) Int. Cl.
*B41J 25/308* (2006.01)
*B41J 11/00* (2006.01)

(52) U.S. Cl.
CPC ......... *B41J 25/3082* (2013.01); *B41J 11/008* (2013.01); *B41J 25/3086* (2013.01); *B41J 25/3088* (2013.01)

(58) Field of Classification Search
CPC .. B41J 25/3082; B41J 11/008; B41J 25/3088; B41J 25/3086
See application file for complete search history.

(56) References Cited

U.S. PATENT DOCUMENTS 11,524,512 B2 * 12/2022 Abe .................... B41J 25/3082

* cited by examiner

*Primary Examiner* — Henok D Legesse
(74) *Attorney, Agent, or Firm* — Canon U.S.A., Inc. IP Division

(57) ABSTRACT

There is provided a printing apparatus which includes the following: A printhead including a plurality of nozzles that discharge ink to a print medium. A first detection unit that detects a distance between the printhead and a platen. An adjustment unit that adjusts the distance between the printhead and the platen. An acquisition unit that acquires difference information concerning a difference of a distance between the platen and each of the nozzle on an upstream side and the nozzle on a downstream side in a conveyance direction of the print medium. The adjustment unit adjusts the distance based on a detection result of the first detection unit and the difference information acquired by the acquisition unit.

22 Claims, 21 Drawing Sheets

FIG. 8

| LIFT CAM ANGLE [°] | HP DISTANCE [mm] | MULTI-SENSOR LIGHT RECEIVING AMOUNT [mV] |
|---|---|---|
| 10 | 3.5 | 100 |
| 20 | 3.7 | 90 |
| 30 | 4.0 | 81 |
| 40 | 4.1 | 72 |
| ⋮ | ⋮ | ⋮ |
| 240 | 8.0 | 10 |

FIG. 11

| n | CARRIAGE POSITION X(n) | UPSTREAM-SIDE HP DISTANCE Hu(n) | DOWNSTREAM-SIDE HP DISTANCE Hd(n) | PLATEN SPECIFIC VALUE Pb | UPSTREAM-SIDE HP DISTANCE Hu(n)' AFTER FACTORY ADJUSTMENT | DOWNSTREAM-SIDE HP DISTANCE Hd(n)' AFTER FACTORY ADJUSTMENT | MULTI-SENSOR LIGHT RECEIVING AMOUNT AT TIME OF FACTORY ADJUSTMENT | SENSOR POSITION HP DISTANCE Hs(n) AT TIME OF FACTORY ADJUSTMENT |
|---|---|---|---|---|---|---|---|---|
| 1 | X(1) 500 | Hu(1) 4.0 | Hd(1) 4.1 | 0.2 | Hu(1)' 3.8 | Hd(1)' 3.9 | b1 82 | Hs(1) 3.81 |
| 2 | X(2) 1000 | Hu(2) 4.6 | Hd(2) 4.5 | | Hu(2)' 4.4 | Hd(2)' 4.3 | b2 60 | Hs(2) 4.39 |
| 3 | X(3) 1500 | Hu(3) 3.9 | Hd(3) 3.8 | | Hu(3)' 3.7 | Hd(3)' 3.6 | b3 95 | Hs(3) 3.69 |

FIG. 16

| n | CARRIAGE POSITION X(n) | UPSTREAM-SIDE HP DISTANCE Hu(n) | DOWN-STREAM-SIDE HP DISTANCE Hd(n) | PLATEN SPECIFIC VALUE Pb | UPSTREAM-SIDE HP DISTANCE Hu(n)' AFTER FACTORY ADJUSTMENT | DOWNSTREAM-SIDE HP DISTANCE Hd(n)' AFTER FACTORY ADJUSTMENT | MULTI-SENSOR LIGHT RECEIVING AMOUNT AT TIME OF FACTORY ADJUSTMENT | SENSOR POSITION HP DISTANCE Hs(n) AT TIME OF FACTORY ADJUSTMENT |
|---|---|---|---|---|---|---|---|---|
| 1 | X(1) 500 | Hu(1) 4.0 | Hd(1) 4.1 | 0.2 | Hu(1)' 3.8 | Hd(1)' 3.9 | b1 82 | Hs(1) 3.81 |
| 2 | X(2) 1000 | Hu(2) 4.6 | Hd(2) 4.5 | | Hu(2)' 4.4 | Hd(2)' 4.3 | b2 60 | Hs(2) 4.39 |
| 3 | X(3) 1500 | Hu(3) 3.9 | Hd(3) 3.8 | | Hu(3)' 3.7 | Hd(3)' 3.6 | b3 95 | Hs(3) 3.69 |

| n | SENSOR POSITION HP DISTANCE Hs(n)' AFTER DISTRIBUTION | UPSTREAM/DOWNSTREAM DIFFERENCE BETWEEN SHEETS ΔQ(n) AFTER DISTRIBUTION | UPSTREAM-SIDE HP DISTANCE Hu(n)" AFTER DISTRIBUTION | DOWNSTREAM-SIDE HP DISTANCE Hd(n)" AFTER DISTRIBUTION | PLATEN SPECIFIC VALUE Pb' AFTER DISTRIBUTION |
|---|---|---|---|---|---|
| 1 | Hs(1)' 3.22 | ΔQ(1) 0.17 | Hu(1)" 3.24 | Hd(1)" 3.07 | -0.425 |
| 2 | Hs(2)' 3.78 | ΔQ(2) 0.2 | Hu(2)" 3.8 | Hd(2)" 3.6 | |
| 3 | Hs(3)' 3.08 | ΔQ(3) 0.15 | Hu(3)" 3.1 | Hd(3)" 2.95 | |

PRINTING APPARATUS AND CONTROL METHOD THEREOF FOR ADJUSTING THE DISTANCE BETWEEN A PRINTHEAD AND A PRINT MEDIUM

CROSS-REFERENCE TO RELATED APPLICATIONS

This application is a Continuation of U.S. patent application Ser. No. 17/348,283 filed Jun. 15, 2021, which claims priority from Japanese Application No. 2020-106404 filed Jun. 19, 2020. The disclosures of the above-named applications are hereby incorporated by reference herein in their entireties.

BACKGROUND

Field

The present disclosure relates to a printing apparatus and a control method thereof.

Description of the Related Art

Conventionally, there is known an inkjet printing apparatus capable of adjusting the distance between a printhead and a print medium. Japanese Patent Laid-Open No. 2016-112881 proposes a technique of, in a serial-type inkjet printing apparatus, adjusting the height of a carriage based on correlation data between the driving amount of a mechanism for moving the carriage up/down and the distance between a printhead and a platen.

SUMMARY

According to one embodiment of the present disclosure, there is provided a printing apparatus including: a printhead including a plurality of nozzles configured to discharge ink to a print medium; a first detection unit configured to detect a distance between the printhead and a platen; an adjustment unit configured to adjust the distance between the printhead and the platen; and an acquisition unit configured to acquire difference information concerning a difference of a distance between the platen and each of the nozzle on an upstream side and the nozzle on a downstream side in a conveyance direction of the print medium, wherein the adjustment unit adjusts the distance based on a detection result of the first detection unit and the difference information acquired by the acquisition unit.

According to another embodiment of the present disclosure, there is provided a control method of a printing apparatus including a printhead including a plurality of nozzles configured to discharge ink to a print medium, the method including: detecting a distance between the printhead and a platen; adjusting the distance between the printhead and the platen; and acquiring difference information concerning a difference of a distance between the platen and each of the nozzle on an upstream side and the nozzle on a downstream side in a conveyance direction of the print medium, wherein in the adjusting, the distance is adjusted based on a detection result in the detecting the distance and the difference information acquired in the acquiring.

Further features of the present disclosure will become apparent from the following description of exemplary embodiments (with reference to the attached drawings).

BRIEF DESCRIPTION OF THE DRAWINGS

FIG. 8 is a view showing the relationship between a lift cam angle, an HP distance, and a multi-sensor light receiving amount according to one embodiment.

FIG. 11 is a view showing examples of parameters stored in a main body ROM at the time of factory adjustment according to one embodiment.

FIG. 16 is a view showing examples of parameters stored in the main body ROM at the time of arrival at the user according to one embodiment.

DESCRIPTION OF THE EMBODIMENTS

Figure 1:
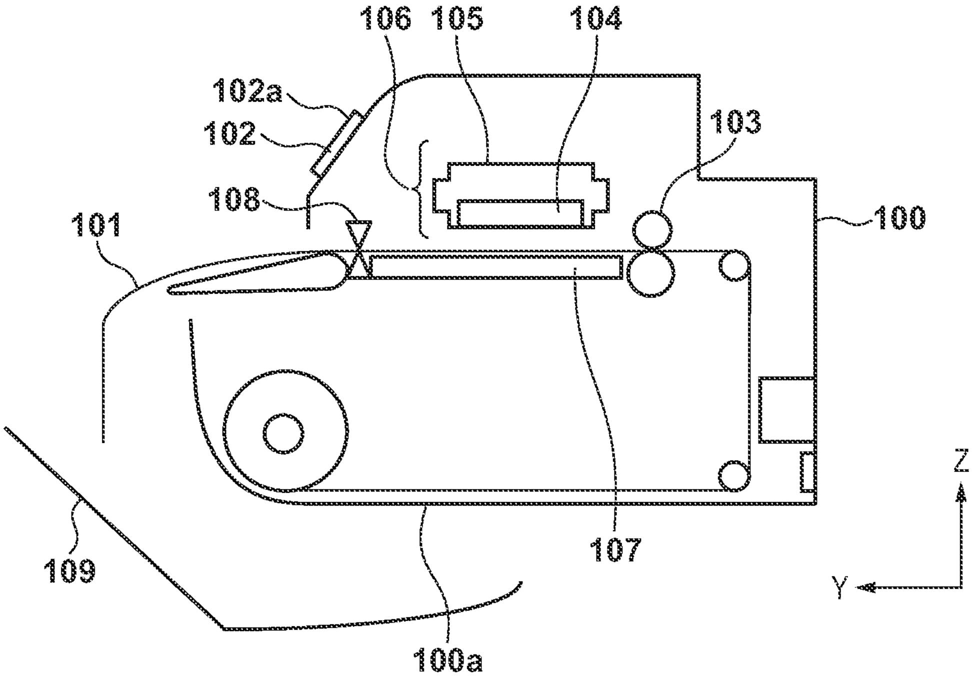
FIG. 1 is a schematic view showing an example of the configuration of an inkjet printing apparatus according to one embodiment.

In the printing apparatus described in the Background section, if the printhead is provided while tilting relative to the platen due to an assembly error or the like, a difference may be generated in the distance from the printhead to a print medium on the platen between the upstream side and the downstream side in the conveyance direction of the print medium. In the conventional technique described in the Background section, since the height of the carriage is adjusted based on the detection result of a sensor provided at a predetermined position of the carriage, the difference of the distance up to the print medium between the upstream side and the downstream side of the printhead is not taken into consideration. However, the difference of the distance may influence ink landing accuracy and lead to degradation of quality of a printed image.

Various embodiments of the present disclosure provide a technique for improving the print quality of a printing apparatus capable of adjusting the distance between a printhead and a print medium.

Hereinafter, various embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in this specification, the term "printing" (to be also referred to as "print" hereinafter) not only includes the formation of significant information such as characters and graphics, but also broadly includes the formation of images, figures, patterns, and the like on a print medium, or the processing of the medium, regardless of whether they are significant or insignificant and whether they are visualized so as to be visually perceivable by humans.

In addition, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to also be referred to as a "liquid" hereinafter) should be extensively interpreted in a manner similar to the definition of "printing (print)" described above. That is, "ink" includes a liquid which, when applied onto a print medium, can form images, figures, patterns, and the like, can process the print medium, or can process ink (for example, solidify or insolubilize a coloring material contained in ink applied to the print medium).

Furthermore, a "nozzle" generically means an orifice or a liquid channel communicating with it, and an element for generating energy used to discharge ink, unless otherwise specified.

First Embodiment

Outline of Inkjet Printing Apparatus

The outline of an inkjet printing apparatus 100 (to be referred to as the printing apparatus 100 hereinafter) according to one embodiment will be described first with reference to FIG. 1. FIG. 1 is a schematic view showing an example of the configuration of the printing apparatus 100 according to an embodiment. The printing apparatus 100 discharges ink to a print medium 101, thereby printing an image. In this embodiment, the print medium 101 is a roll sheet. However, a cut sheet may be used as the print medium 101. The printing apparatus 100 includes an accommodation unit 100*a*, an operation panel 102, a display unit 102*a*, a conveyance roller 103, a print unit 106, a platen 107, a cutter 108, and a basket 109.

The accommodation unit 100*a* accommodates the print medium 101. The operation panel 102 accepts various kinds of inputs from a user. The display unit 102*a* is, for example, a liquid crystal display, and displays various kinds of information. Note that the operation panel 102 may be a touch panel having the function of the display unit 102*a*, and may include hard keys. The conveyance roller 103 conveys the print medium 101. In this embodiment, the conveyance roller 103 conveys the print medium 101 to the platen 107.

The print unit 106 prints an image on the print medium 101 conveyed to the platen 107. The print unit 106 includes a printhead 104 and a carriage 105. The printhead 104 discharges ink from nozzles based on print data. The carriage 105 has the printhead 104 mounted and reciprocally moves in a direction crossing the conveyance direction of the print medium 101. When the printhead 104 discharges ink while being reciprocally moved by the carriage 105, an image including, for example, characters, symbols, and the like is formed on the print medium 101. The moving direction of the carriage 105 will sometimes be referred to as a main scanning direction, and the conveyance direction of the print medium 101 as a sub-scanning direction hereinafter.

The platen 107 is provided on the lower side of the print unit 106 while facing the print unit 106, and supports the print medium 101 during conveyance. In the embodiment, the platen 107 may be a suction platen capable of suppressing float-up of the print medium 101 during conveyance by bringing the print medium 101 into tight contact with the platen by a suction force.

The cutter 108 cuts the print medium 101 after printing. The basket 109 holds the print medium 101 cut by the cutter 108 and discharged from the discharge port of the printing apparatus 100.

Configuration of Print Unit

The printhead 104 and the carriage 105, which constitute the print unit 106, will be described next.

Figure 2:
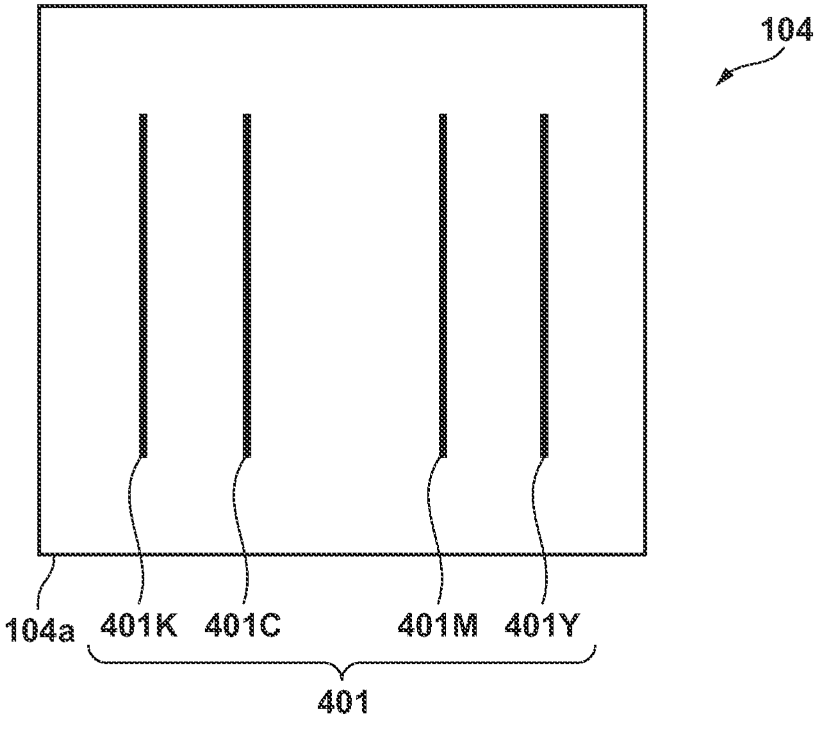
FIG. 2 is a view showing the nozzle surface of a printhead according to one embodiment.

FIG. 2 is a view showing a nozzle surface 104*a* of the printhead 104. Since the printhead 104 discharges different inks, one or a plurality of nozzle arrays 401 (orifice arrays) are formed in the nozzle surface 104*a* on the lower side of the printhead 104. In this embodiment, four nozzle arrays 401K, 401C, 401M, and 401Y are provided, and black (K), cyan (C), magenta (M), and yellow (Y) inks can be discharged. For example, in each nozzle array, 1,280 print elements are arrayed at an interval of 1,200 dpi in the sub-scanning direction. The plurality of nozzle arrays 401K, 401C, 401M, and 401Y are used to print dots in a common region in the sub-scanning direction of the print medium 101.

Figure 3:
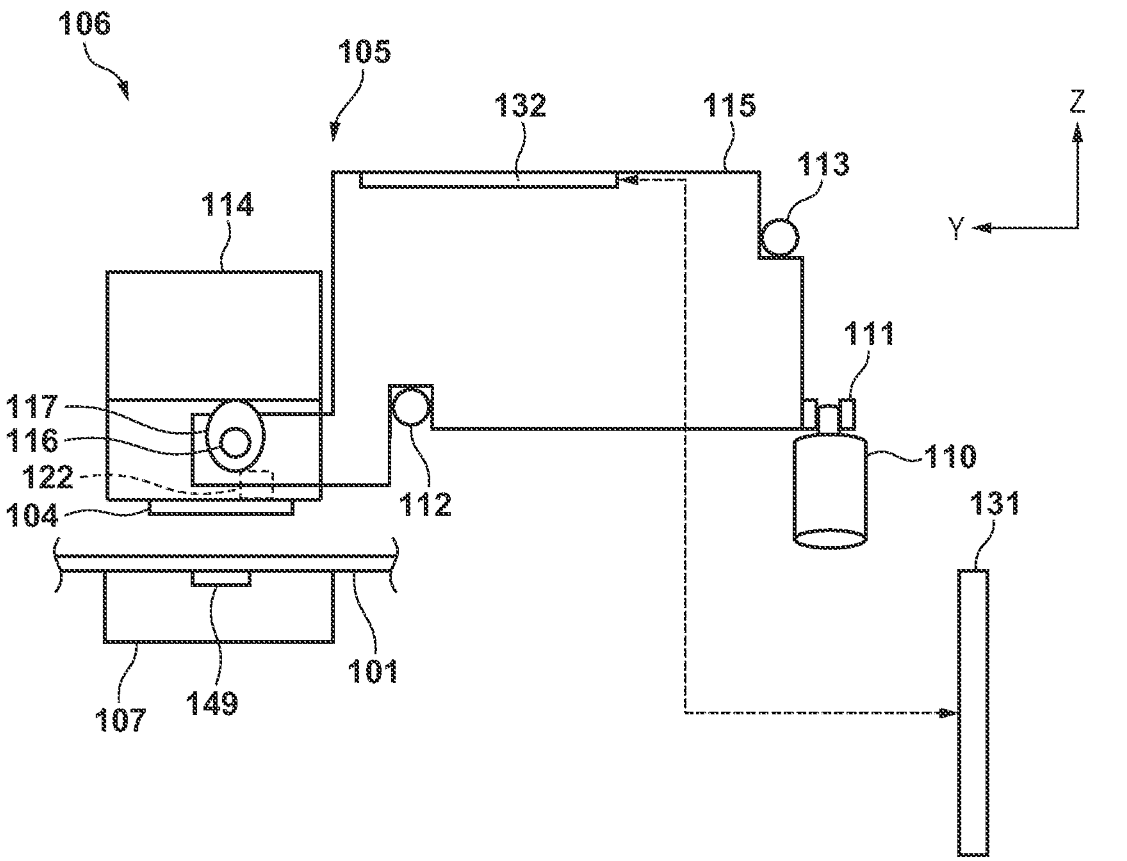
FIG. 3 is a schematic sectional view showing a print unit and a peripheral portion thereof according to one embodiment.
Figure 4:
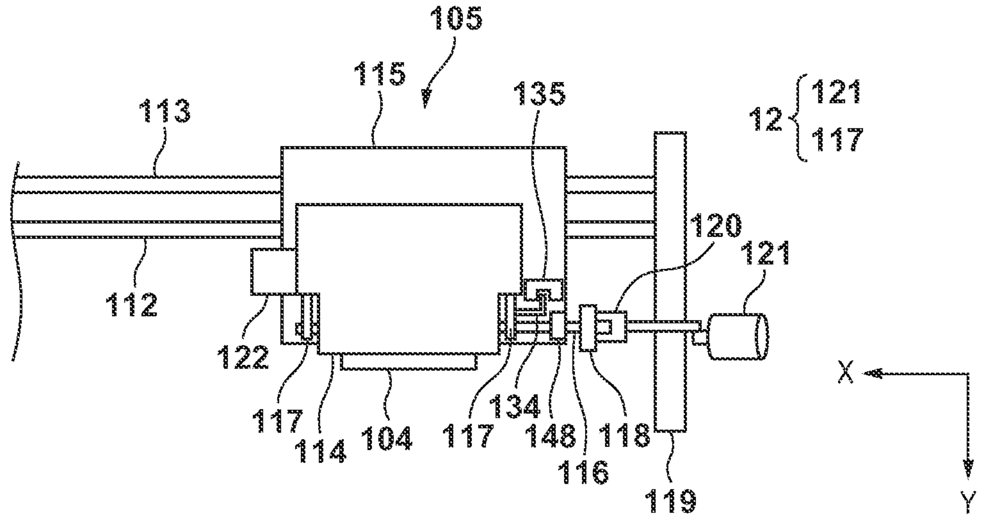
FIG. 4 is a schematic sectional view showing the configuration of a carriage according to one embodiment.

FIG. 3 is a schematic sectional view showing the print unit 106 and a peripheral portion thereof, and FIG. 4 is a schematic sectional view showing the configuration of the carriage 105.

The carriage 105 is configured to be movable reciprocally along a guide rail A 112 and a guide rail B 113 by receiving the driving force of a carriage motor 110 via a carriage belt 111.

In addition, an optical multi-sensor 122 having a plurality of measuring functions is mounted in the carriage 105. The multi-sensor 122 can be configured to include optical components such as a light emitting element and a light receiving element. In this embodiment, the position of an end portion of the print medium 101, the distance from the printhead 104 to the print medium 101, and information from a platen patch 149 (to be described later), and the like are optically detected by the multi-sensor 122.

On the platen 107, a plurality of platen patches 149 are provided at positions facing the printhead 104. The plurality of platen patches 149 may be provided, for example, near portions where measurement is performed for the platen 107, as will be described later. As an example, concave portions are formed in the platen 107, and the platen patches 149 are provided on the bottom surfaces of the concave portions.

Lifting Operation of Printhead

The lifting operation of the printhead 104, which is performed to adjust the distance (to be referred to as an HP distance hereinafter) between the printhead 104 and the platen 107, will be described next. In this embodiment, an adjustment unit 12 including lift cams 117 and a lift motor 121 that drives the lift cams 117 is provided. The adjustment unit 12 is configured to move the printhead 104 up/down via the carriage 105, thereby adjusting the HP distance in accordance with predetermined conditions such as the type and thickness of the print medium 101 and a print mode. Note that it is the distance between the printhead 104 and the print medium 101 that influences the landing accuracy of ink discharged from the printhead 104. However, the distance between the printhead 104 and the print medium 101 is the distance obtained by subtracting the thickness of the print medium 101 from the HP distance. Hence, the distance between the printhead 104 and the print medium 101 can substantially be adjusted by adjusting the HP distance.

The carriage 105 includes a main carriage 114 having the printhead 104 mounted, and a rear carriage 115 connected to the carriage belt 111, and these are connected via the lift shaft 116 and the outer peripheral portions of the lift cams 117. Also, a lift coupling 118 is provided at one end portion of the lift shaft 116. When the carriage 105 moves to the right end portion (an end portion on the—side in the X-axis direction) along the guide rail A 112, the lift coupling 118 is connected to a driving-side coupling 120 provided in a printing apparatus housing 119. The driving-side coupling 120 is connected to the lift motor 121. When the lift motor 121 rotates in the CW direction in a state in which the lift coupling 118 and the driving-side coupling 120 are connected, the lift coupling 118, the lift shaft 116 connected to it, and the lift cams 117 rotate together.

Figure 5A:
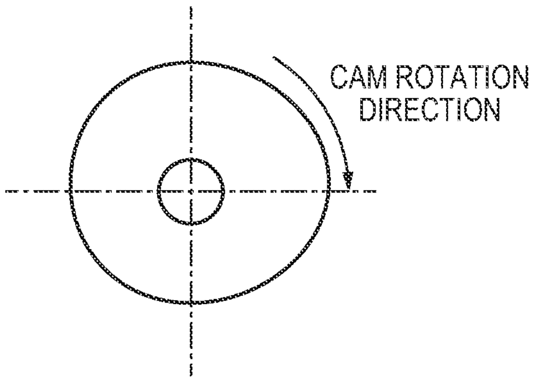
FIG. 5A is a schematic view showing the shape of a lift cam according to one embodiment.
Figure 5B:
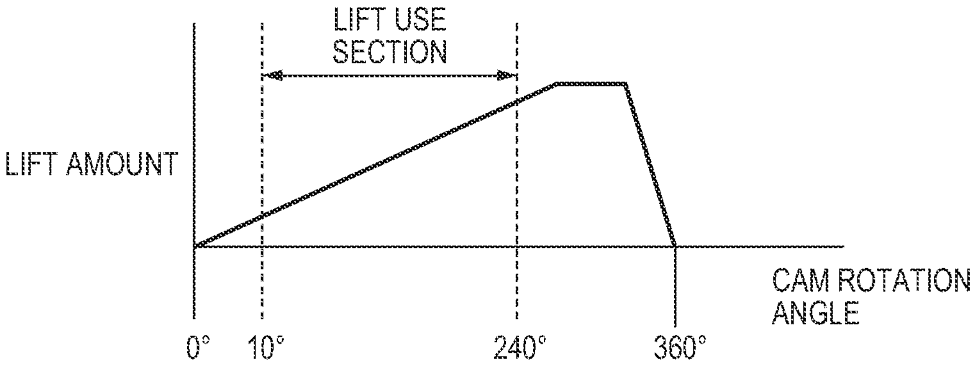
FIG. 5B is a view showing the relationship between the rotation angle of the lift cam and a lift amount according to one embodiment.

FIG. 5A is a schematic view showing the shape of the lift cam 117, and FIG. 5B is a view showing the relationship between the rotation angle of the lift cam 117 and a lift amount.

The outer periphery of the lift cam 117 has a smooth arc shape eccentric to the lift shaft 116, and is supported by a cam support surface provided on the rear carriage 115. With this configuration, when the lift cam 117 is rotated by the lift motor 121, the cam support surface and the lift shaft 116 come close or separate in accordance with the eccentricity amount. Hence, the relative height of the main carriage 114 with respect to the rear carriage 115 changes. Accordingly, the distance between the printhead 104 and the platen 107 also changes. In this respect, the lift motor 121 is a motor capable of adjusting the distance between the printhead 104 and the platen 107 via the lift cams 117 and the main carriage 114.

Also, as shown in FIG. 5B, the shape of the lift cam 117 is configured to increase the eccentricity amount when the lift cam 117 rotates in the CW direction (clockwise direction) in the rotation angle region of a lift use section. For this reason, if the angle of the lift cam 117 is controlled to stop the lift cam 117 at a predetermined angle, and the angle can be maintained, the height of the printhead 104 can freely be controlled.

Here, the outer periphery of the lift cam 117 and the cam support surface are configured to always have an angle. For this reason, even when the lift cam 117 stops at a predetermined rotation angle, if a vibration or the like is externally applied, the lift cam 117 may be unable to maintain the rotation angle and may rotate. To prevent this, a one-way clutch 148 is attached to the lift shaft 116 to allow the lift shaft 116 to rotate only in one direction (CW direction).

With this configuration, in the lift use section, rotation in the CW direction from the state in which the lift cam 117 stops at a predetermined rotation angle, is rotation in a direction in which the eccentricity amount of the lift cam 117 increases. Hence, to make the lift cam 117 rotate from the stop state, a torque enough to raise the main carriage 114 is necessary, and the lift cam 117 cannot rotate if the driving force of the motor or the like is absent. In addition, rotation in the CCW direction (counterclockwise direction) is prevented by the one-way clutch 148. With this configuration, even the lift cam 117 with the smooth outer periphery can prevent the rotation of the lift shaft 116 caused by an external vibration or the like.

Angle control of the lift cam 117 will be described next. As shown in FIG. 4, the lift cam 117 is provided with a flag 134 that displaces along with the rotation of the lift cam 117 so that the phase (rotation angle) in cam rotation can be known. The timing (ON timing) at which the flag 134 blocks light from the light emitting element of a photosensor 135 provided on the side of the rear carriage 115 or the timing (OFF timing) at which the light shielding state changes to light transmission is the start point of the lift cam 117.

Angle control of the lift cam 117 is performed by rotationally driving the lift motor 121 by an arbitrary amount while setting the ON or OFF timing to the start point, that is, 0°. For example, the lift motor 121 may incorporate an optical encoder, and the rotation angle may be detected at a high resolution. Then, rotation angle of the lift cam 117 may be acquired based on the rotation angle of the lift motor 121. Note that to detect the start point of the lift cam 117 or the rotation angle of the lift motor, a known technique can appropriately be employed.

Control Configuration

Figure 6:
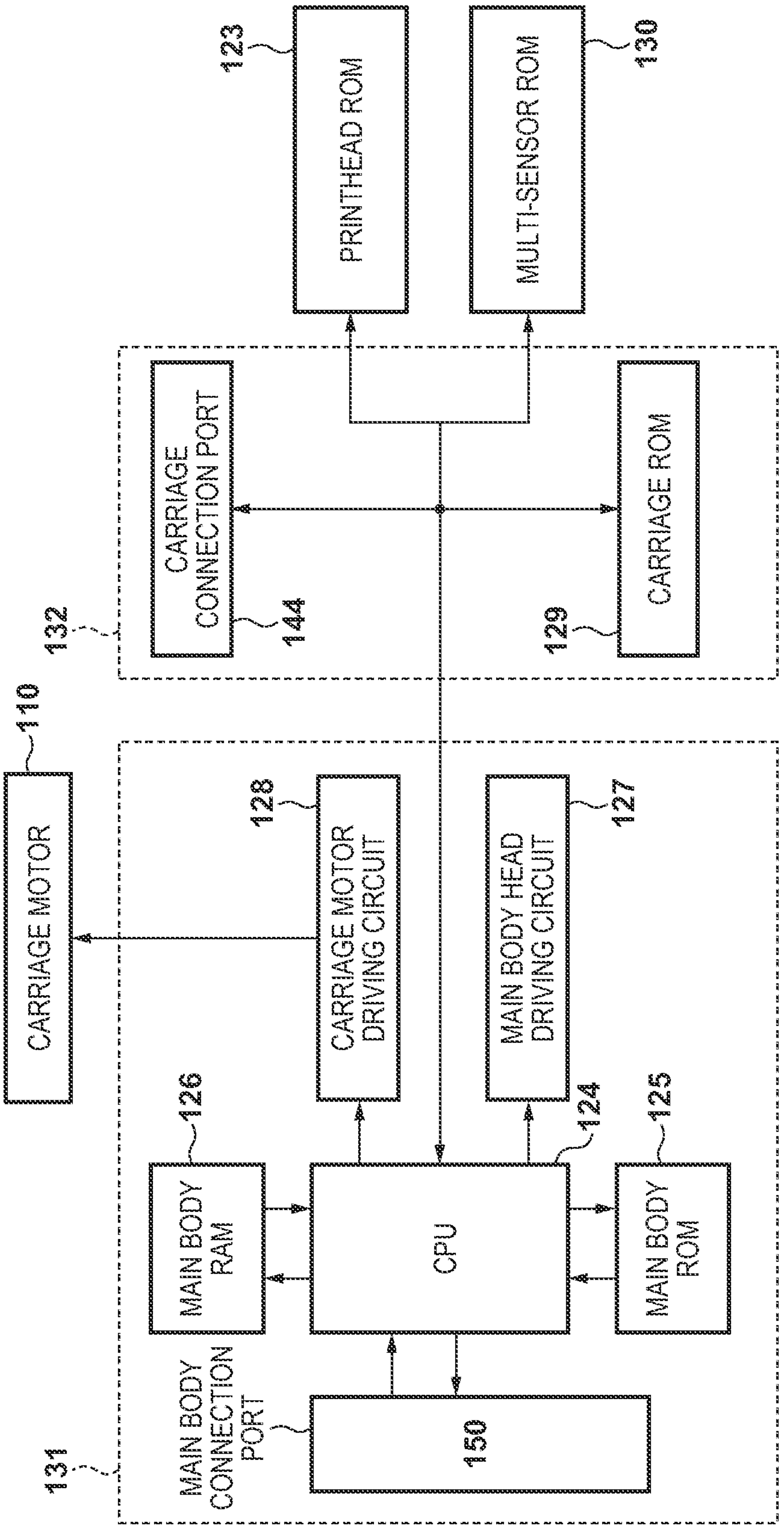
FIG. 6 is a block diagram showing the schematic configuration of the control system of the printing apparatus according to one embodiment.

FIG. 6 is a block diagram showing the schematic configuration of the control system of the printing apparatus 100 according to the embodiment. In this embodiment, the printing apparatus 100 includes a main body control board 131 and a carriage control board 132. The main body control board 131 includes a CPU 124, a main body ROM 125, a main body RAM 126, a main body head driving circuit 127, a carriage motor driving circuit 128, and a main body connection port 150. The carriage control board 132 includes a carriage ROM 129 and a carriage connection port 144.

The CPU 124 generally controls the operation of each unit of the printing apparatus 100 based on a control program stored in the main body ROM 125 and various kinds of data stored in the main body RAM 126. The main body ROM 125 stores programs to be executed by the CPU 124 and various kinds of information. The main body RAM 126 functions as the work area of the CPU 124. The main body head driving circuit 127 controls ink discharge of the printhead 104. The carriage motor driving circuit 128 controls driving of the carriage motor 110. The CPU 124 transmits/receives signals to/from the main body ROM 125, the main body RAM 126, the main body head driving circuit 127, the carriage motor driving circuit 128, and various kinds of motor driving circuits (not shown), thereby controlling various kinds of operations.

The carriage ROM 129 stores data such as various kinds of parameters concerning the carriage 105. The main body control board 131 is connected to the carriage control board 132, and the CPU 124 can execute processing such as data read and write for the carriage ROM 129 on the carriage control board 132. Also, the carriage connection port 144 is electrically connected to the outside, thereby supplying power to the carriage control board 132. Data in the carriage ROM 129 can be rewritten by supplying power from the carriage connection port 144.

In addition, a printhead ROM 123 that stores data such as various kinds of parameters concerning the printhead 104, and a multi-sensor ROM 130 that stores data such as the detection result of the multi-sensor 122 are connected to the carriage control board 132. The CPU 124 on the main body control board 131 can execute control such as data read and write for these ROMs via the carriage control board 132.

The main body connection port 150 is provided on the main body control board 131 and electrically connected to the outside, thereby supplying power to the main body control board 131. Data in the main body ROM 125 or the main body RAM 126 can be rewritten by supplying power from the main body connection port 150.

Adjustment of Printhead-Platen Distance

Details of each adjustment step of the HP distance of the printing apparatus 100 performed in a production site such as a factory will be described next. In this embodiment, the adjustment steps include (1) an adjustment step by an adjustment tool on the production site, (2) an adjustment step by the main body of the printing apparatus 100 on the production site, and (3) an adjustment step at the time of use by the user.

(1) Adjustment Step by Adjustment Tool on Production Site

Figure 7A:
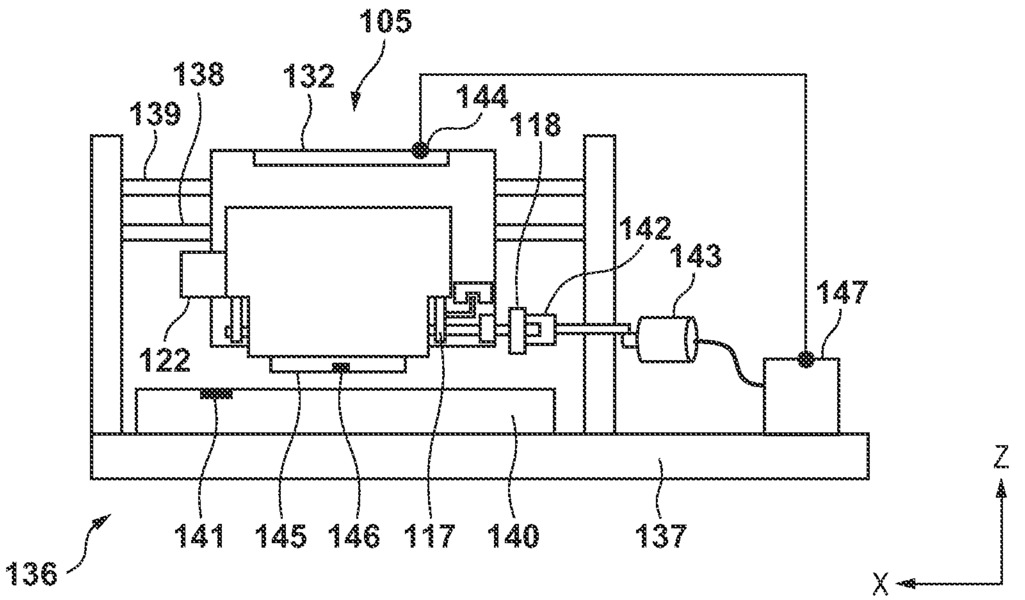
FIG. 7A is a schematic front view showing the configuration of an HP distance adjustment step by an adjustment tool according to one embodiment.
Figure 7B:
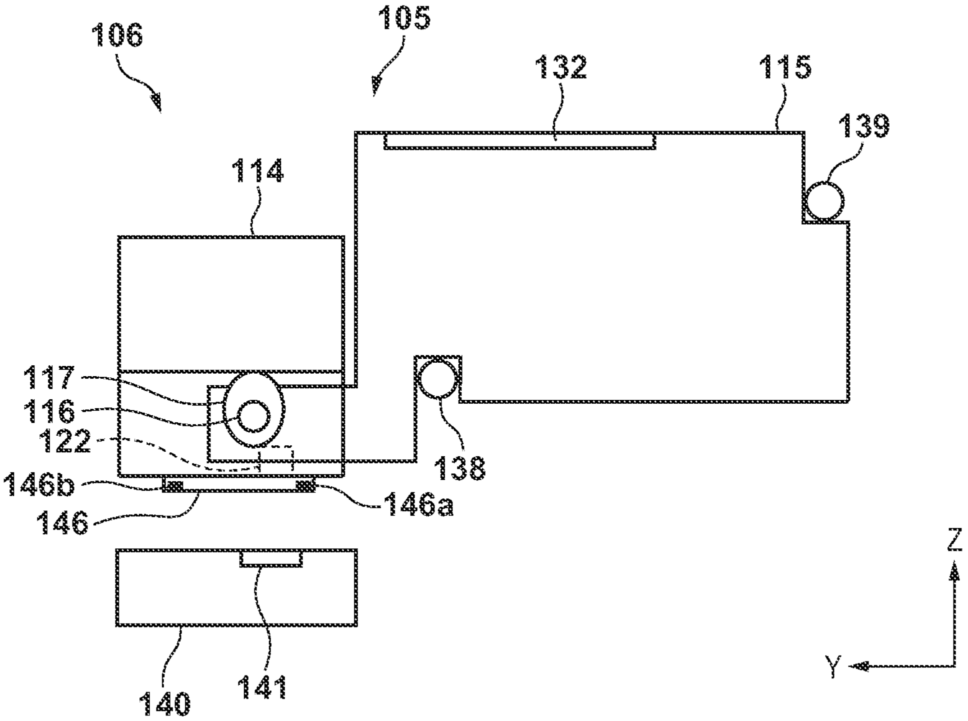
FIG. 7B is a schematic side sectional view showing the configuration of the HP distance adjustment step by the adjustment tool according to one embodiment.

FIGS. 7A and 7B are a schematic front view and a schematic side sectional view, respectively, showing the configuration of the HP distance adjustment step by an adjustment tool 136. The adjustment tool 136 is a tool that simulates the support configuration of the carriage 105 in the printing apparatus 100. Each part corresponding to a constituent component of the printing apparatus 100 will be given a name "dummy XXX" hereinafter (for example, a dummy guide rail A 138 corresponds to the guide rail A 112).

The carriage adjustment tool 136 includes a tool frame 137, the dummy guide rail A 138, and a dummy guide rail B 139 and supports the carriage 105, like the guide rail A 112 and the guide rail B 113 of the printing apparatus 100. In place of the platen 107, a dummy platen 140 is provided at a position facing the carriage 105. A dummy patch 141 is provided at a position facing the multi-sensor 122.

Concerning the relative positional relationship in the Z direction, the dummy guide rail A 138 and the dummy guide rail B 139 are created such that these have the same center sizes as the guide rail A 112 and the guide rail B 113 of the printing apparatus 100 in terms of design. The outer sizes of these are also set based on the center sizes in terms of design. Concerning the relative relationship in the Z direction, the dummy platen 140 and the dummy patch 141 are also produced such that these have the same center sizes as the dummy guide rail A 138 and the dummy guide rail B 139 of the printing apparatus 100 in terms of design.

Also, a tool coupling 142 connected to a tool motor 143 is provided on the tool frame 137, and the tool motor 143 is connected to the lift coupling 118 of the carriage 105 and configured to be rotatable.

In addition, a control device 147 is provided on the tool frame 137 to control power supply to the tool motor 143 and its rotation amount. The control device 147 is connected to the carriage connection port 144 of the carriage control board 132, thereby performing read, write, and rewrite for the carriage ROM 129 and the carriage RAM (not shown). The control device 147 is also configured to supply power to the photosensor 135 via the carriage control board 132 and read out the detection result of the sensor.

In place of the printhead 104, a dummy head 145 is mounted on the carriage 105 set in the carriage adjustment tool 136. The outer shape of the dummy head 145 is formed to be equal to the center size of the printhead 104, and a distance measuring sensor 146 is provided on the lower side of the dummy head 145.

The distance measuring sensor 146 includes an upstream-side distance measuring sensor 146*a* and a downstream-side distance measuring sensor 146*b*. The upstream-side distance measuring sensor 146*a* measures the distance up to the dummy platen 140 at a position corresponding to the upstream-side end portion of the nozzle array 401 of the printhead 104. The downstream-side distance measuring sensor 146*b* measures the distance up to the dummy platen 140 at a position corresponding to the downstream-side end portion of the nozzle array 401. With these, the distance from a position corresponding to an orifice of the printhead 104 to the dummy platen 140 can be measured. In the following description, the distance measured by the upstream-side distance measuring sensor 146*a* will be referred to as an "upstream-side HP distance", and the distance measured by the downstream-side distance measuring sensor 146*b* will be referred to as a "downstream-side HP distance". Note that the HP distance can be the average value of the upstream-side HP distance and the downstream-side HP distance. The distance from the nozzle surface 104*a* of the printhead 104 to the platen 107 in the printing apparatus 100 will also be referred to by the same name.

Note that the HP distance is a distance obtained by subtracting the thickness of the print medium 101 from the distance from the nozzle surface 104*a* to the print medium 101. Hence, it can be said that when the HP distance is made to be close to the design value, the distance from the nozzle surface 104*a* to the print medium 101 also becomes close to the design value.

A detailed adjustment operation of the carriage 105 by the carriage adjustment tool 136 will be described next.

First, the tool motor 143 is rotated by the control device 147. The rotation driving force of the tool motor 143 rotates the lift cams 117 mounted on the carriage 105 via the tool coupling 142, and the main carriage 114 is thus moved up/down. In this process, a moment at which the flag 134 blocks the photosensor 135 is detected by the control device 147, and the lift cam angle at this time is set to 0°. In addition, the value of the detection result of the distance measuring sensor 146 and the value of the light receiving amount of the multi-sensor 122 in a case in which the lift cam angle is 0° are stored in the carriage ROM 129 in association with each other.

Next, the lift cams 117 are further rotated from 0°, and the value of the distance measuring sensor 146 and the value of the light receiving amount of the multi-sensor 122 are stored in the carriage ROM 129 in association with each other for every predetermined angle, for example, 10°. FIG. 8 is a view showing the relationship between the lift cam angle, the HP distance, and the multi-sensor light receiving amount. With this operation and control, correlation data between the HP distance and the multi-sensor light receiving amount is generated for each angle of the lift cams 117, as shown in FIG. 8, and the data can be stored in the carriage ROM 129.

Figure 9A:
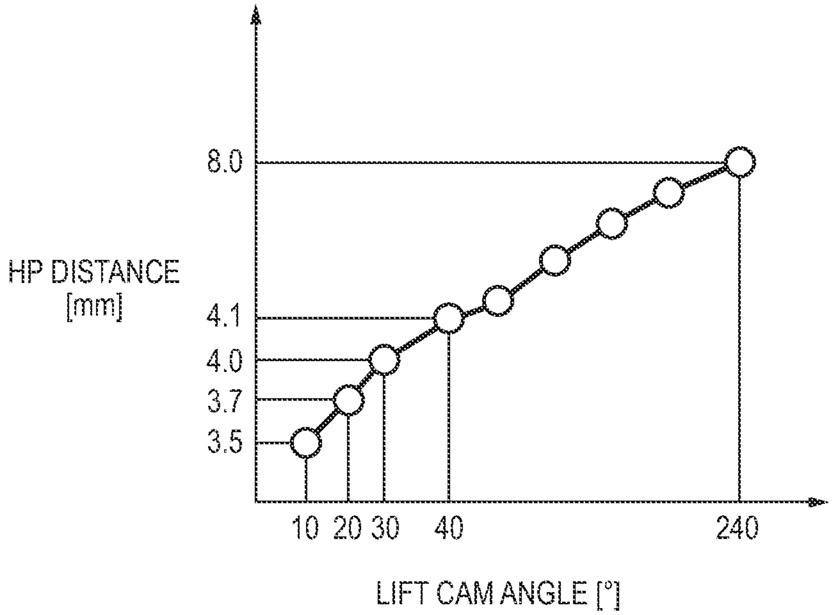
FIG. 9A is a view showing the relationship of the HP distance with respect to the lift cam angle according to one embodiment.
Figure 9B:
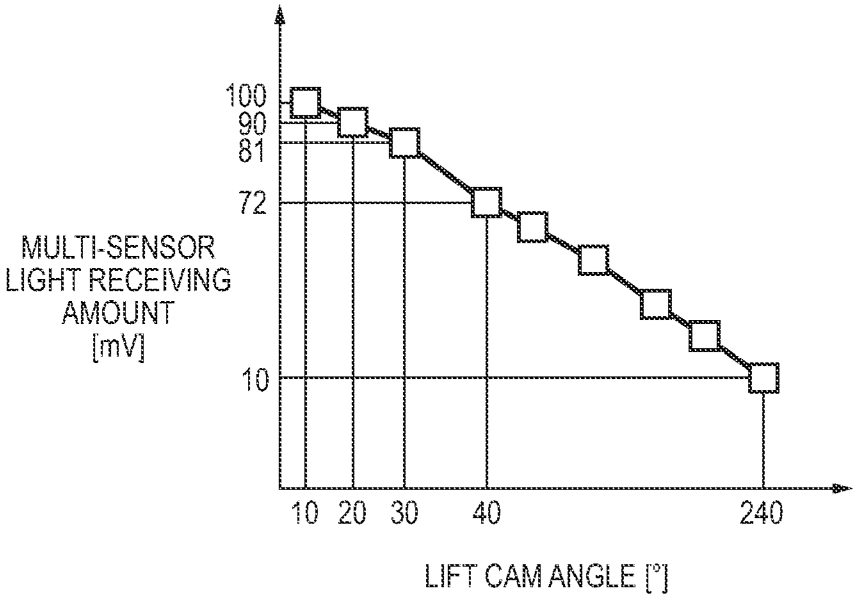
FIG. 9B is a view showing the relationship of the multi-sensor light receiving amount with respect to the lift cam angle according to one embodiment.

Next, for the stored data show in FIG. 8, the control device 147 interpolates the angles by linear interpolation or the like. It is therefore possible to acquire the relationship of the HP distance to the lift cam angle (to be referred to as a "lift cam profile" hereinafter) as shown in FIG. 9A and the relationship between the lift cam angle and the multi-sensor light receiving amount as shown in FIG. 9B. For example, the control device 147 stores the lift cam profile and the relationship between the lift cam angle and the multi-sensor light receiving amount in the carriage ROM. When viewed from a certain aspect, the "lift cam profile" is data that associates the distance information between the printhead 104 and the platen 107 and the control parameter of the adjustment unit 12.

When the lift cam profile is obtained for each carriage 105, the height of the printhead 104, in other words, the HP distance can arbitrarily be adjusted. For example, assume that the carriage 105 mounted in the printing apparatus 100 receives a control instruction to move to a head height corresponding to an HP distance of 4.0 mm. The CPU 124 reads out the lift cam profile from the carriage ROM 129, and controls the lift motor 121 to set a lift cam angle(30°) to obtain the HP distance of 4.0 mm. It can be said that the lift cam angle is associated with the HP distance based on actual measurement in the carriage adjustment tool 136 and is therefore an accurate angle including a component tolerance or an assembly error. The relationship between the HP distance and the lift cam angle is defined for each carriage 105 by the carriage adjustment tool 136. Hence, depending on the difference of the component tolerance or assembly error, the lift cam angle corresponding to the HP distance of 4.0 mm is 29° or 31°, that is, an optimum value for each carriage 105.

(2) Adjustment Step by Printing Apparatus Main Body on Production Site

Figure 10B:
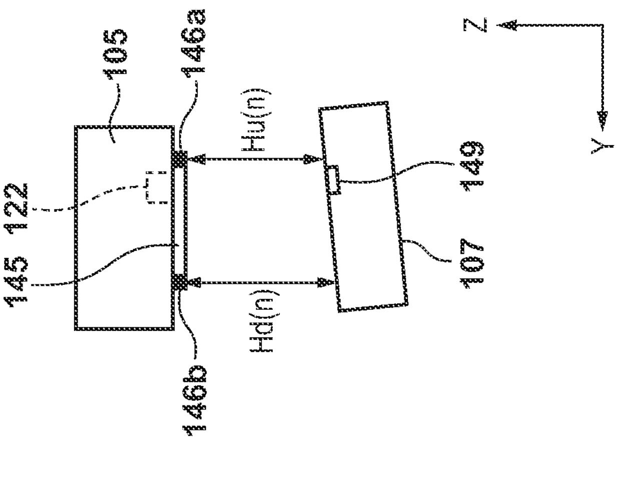
FIG. 10B is a schematic side view showing the HP distance measuring method according to one embodiment.
Figure 10A:
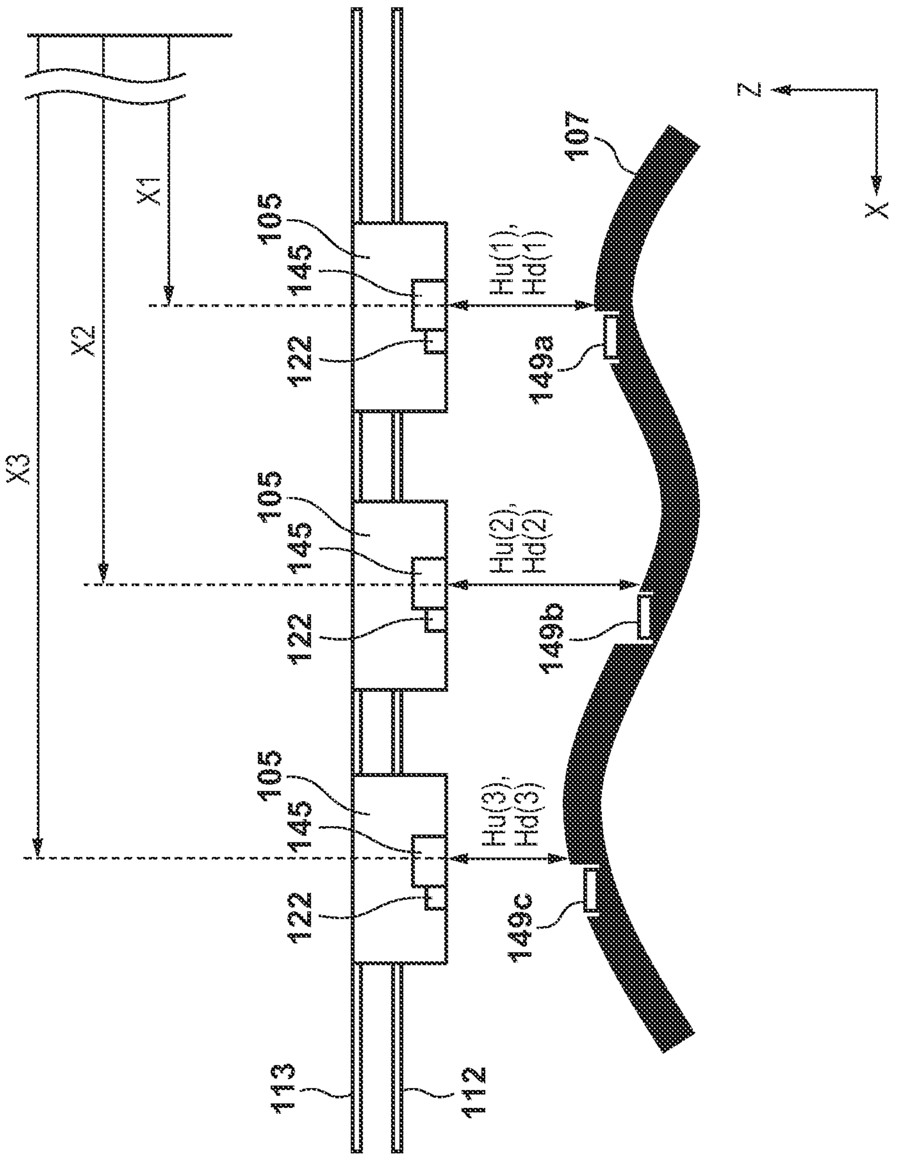
FIG. 10A is a schematic front view showing an HP distance measuring method according to one embodiment.

A method of adjusting the HP distance such that the interval between the printhead 104 and the print medium 101 falls within an arbitrary range after the carriage 105 adjusted by the carriage adjustment tool 136 is mounted in the printing apparatus 100 will be described next. FIG. 10A is a schematic front view showing an HP distance measuring method, and FIG. 10B is a schematic side view showing the HP distance measuring method.

First, the carriage 105 whose lift cam profile is stored in the carriage ROM 129 in the adjustment step by the adjustment tool is attached to the printing apparatus 100. Next, the dummy head 145 used in the adjustment step by the adjustment tool is mounted. In this state, the lift cams of the carriage 105 are rotated by an ideal angle θ corresponding to a predetermined HP distance (to be referred to as an "ideal distance H" hereinafter) in the lift cam profile. In this embodiment, a description will be made assuming that the ideal distance H is 4.0 mm, and the lift cam rotation angle at that time is an ideal angle θ=30°. In a state in which the lift cams 117 are rotated by θ, the carriage 105 with the dummy head 145 mounted is moved to a plurality of predetermined positions X(n) in the main scanning direction, and an upstream-side HP distance Hu(n) and a downstream-side HP distance Hd(n) at each position are measured. FIG. 10A shows a case in which n=1 to 3. However, the number of positions where measurement is performed can appropriately be set.

Note that in this embodiment, X(n) represents a coordinate defined by setting an end position of the print medium 101 to 0 on the right side in the X direction in FIG. 10A in a case in which one end of the print medium 101 is conveyed along a guide member (not shown) installed in the printing apparatus 100. For example, if X(1)=500 mm, X(1) represents a position (=coordinate) 500 mm apart from the end portion of the print medium 101 in the main scanning direction. Note that in this embodiment, the following description will be made assuming that X(1)=500, X(2)=1000, and X(3)=1500. The value X(n) can appropriately be set.

FIG. 11 is a view showing examples of parameters stored in the main body ROM 125 at the time of factory adjustment. As shown in FIG. 11, the CPU 124 stores the values of Hu(n) and Hd(n) corresponding to X(n) in the main body ROM 125 in association with each other.

Also, the CPU 124 calculates an intermediate HP distance Hm based on Hu(n) and Hd(n). In this embodiment, the intermediate HP distance Hm is a distance corresponding to a half of the sum of the maximum value and the minimum value of Hu(n) and Hd(n), that is, the average of the maximum value and the minimum value of Hu(n) and Hd(n). In the example shown in FIG. 11, since the maximum value of the Hu(n) and Hd(n) is 4.6 mm, and the minimum value is 3.8 mm, the intermediate HP distance Hm is 4.2 mm. That is, in the combination of the carriage 105 and the printing apparatus 100, the HP distance is wider by 0.2 mm on average with respect to the ideal distance H=4.0 mm. The difference between the ideal distance H and the intermediate HP distance Hm measured in the printing apparatus 100 is the difference specific to the apparatus, which is generated when the main body components such as the platen 107, the guide rail A 112, and the guide rail B 113 other than the carriage 105 are assembled. This difference will be referred to as a platen height specific value Pb hereinafter. Since the same carriage 105 is used at the time of HP distance measurement using the adjustment tool, the specific value Pb depends on the main body side of the printing apparatus 100 (the components other than the carriage 105). The platen height specific value Pb is stored in the main body ROM 125 on the main body control board 131 of the printing apparatus 100.

Note that the calculation method of the intermediate HP distance Hm is merely an example, and another method can also be employed. For example, the average of all measured values of Hu(n) and Hd(n) may be obtained as the intermediate HP distance Hm.

Next, the CPU 124 reads out the lift cam profile stored in the carriage ROM 129 and the platen height specific value Pb stored in the main body ROM 125. At this point of time, the intermediate HP distance Hm is wider than the design value by the platen height specific value Pb. Hence, when the lift cam profile is offset by the increased amount of the HP distance, the lift cam angle that sets the HP distance to the design value is newly derived as θ'.

Figure 12:
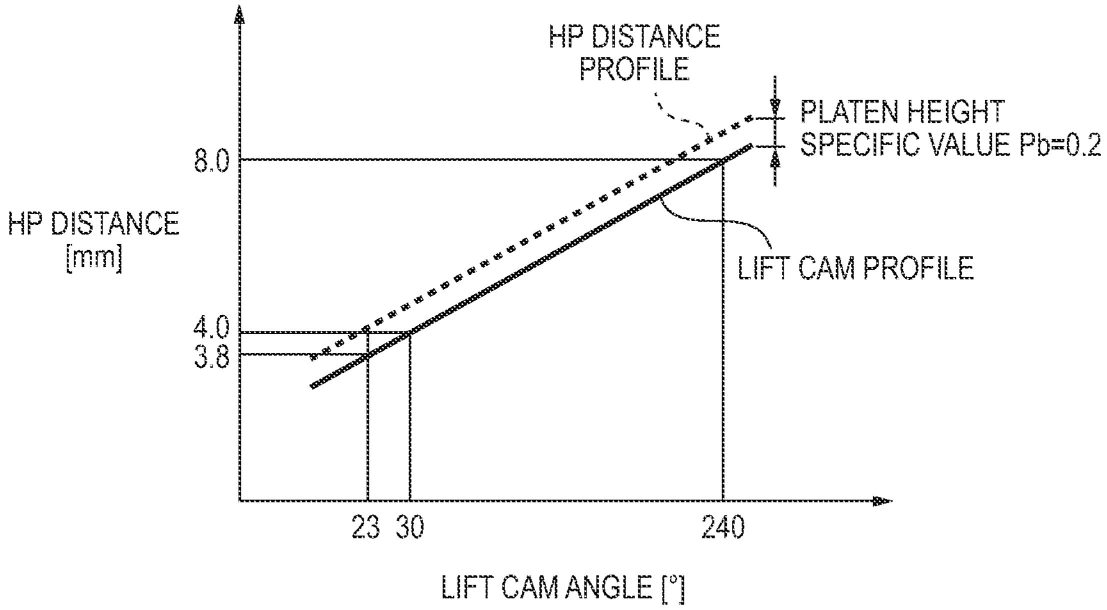
FIG. 12 is a conceptual view of HP distance profile derivation according to one embodiment.

Derivation of the lift cam angle θ' will be described in detail with reference to FIG. 12. FIG. 12 is a conceptual view of HP distance profile derivation. For example, in this lift cam profile, when the HP distance is 4.0 mm, the lift cam angle is 30°. Here, the platen height specific value Pb of the printing apparatus 100 is 0.2 mm. For this reason, if the lift cam angle is 30°, the actual intermediate HP distance Hm of the printing apparatus 100 is 4.2 mm. Similarly, in the printing apparatus 100, even for another lift cam angle, the actual intermediate HP distance Hm is always offset by 0.2 mm with respect to the value in the lift cam profile. For this reason, to set the HP distance to 4.0 mm in the printing apparatus 100, it is necessary to set a lift cam angle of 23° at which an HP distance of 3.8 mm is obtained in the lift cam profile. In other words, in the printing apparatus 100, to set the HP distance to 4.0 mm, the lift cam angle in control needs to be offset to θ'=23° with respect to the ideal angle θ=30°.

As described above, when the HP distance of the lift cam profile is offset by an amount corresponding to the platen height specific value Pb, a new correlation profile between the HP distance and the lift cam angle θ' for the printing apparatus 100 is obtained. This will be referred to as an HP distance profile. By rotationally driving the lift cams 117 using the HP distance profile, the HP distance can be adjusted to the design value. That is, when this step is executed, an HP distance error caused by a component tolerance or an assembly error on the main body side of the printing apparatus 100 can be canceled. The CPU 124 stores, in the main body ROM 125, the above-described platen height specific value Pb, and the information of an upstream-side HP distance Hu(n)' after factory adjustment and a downstream-side HP distance Hd(n)' after factory adjustment, which are offset by the platen height specific value Pb.

Figure 13B:
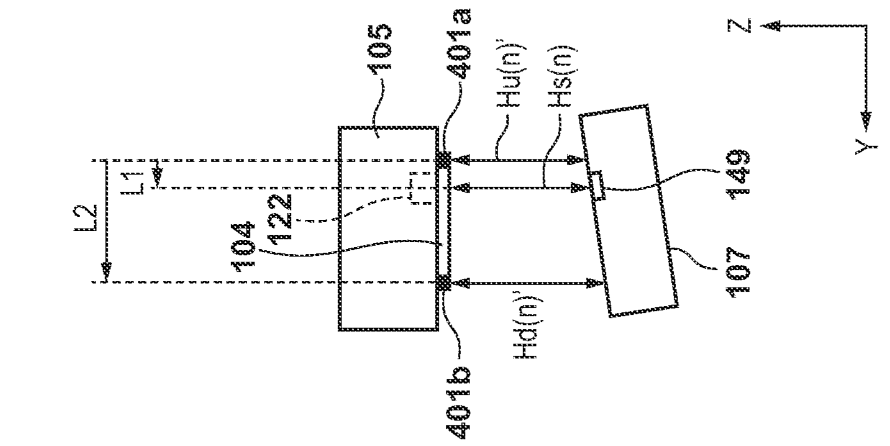
FIG. 13B is a schematic side sectional view showing a state in which the multi-sensor performs light emission/reception for the platen patches in the printing apparatus according to one embodiment.
Figure 13A:
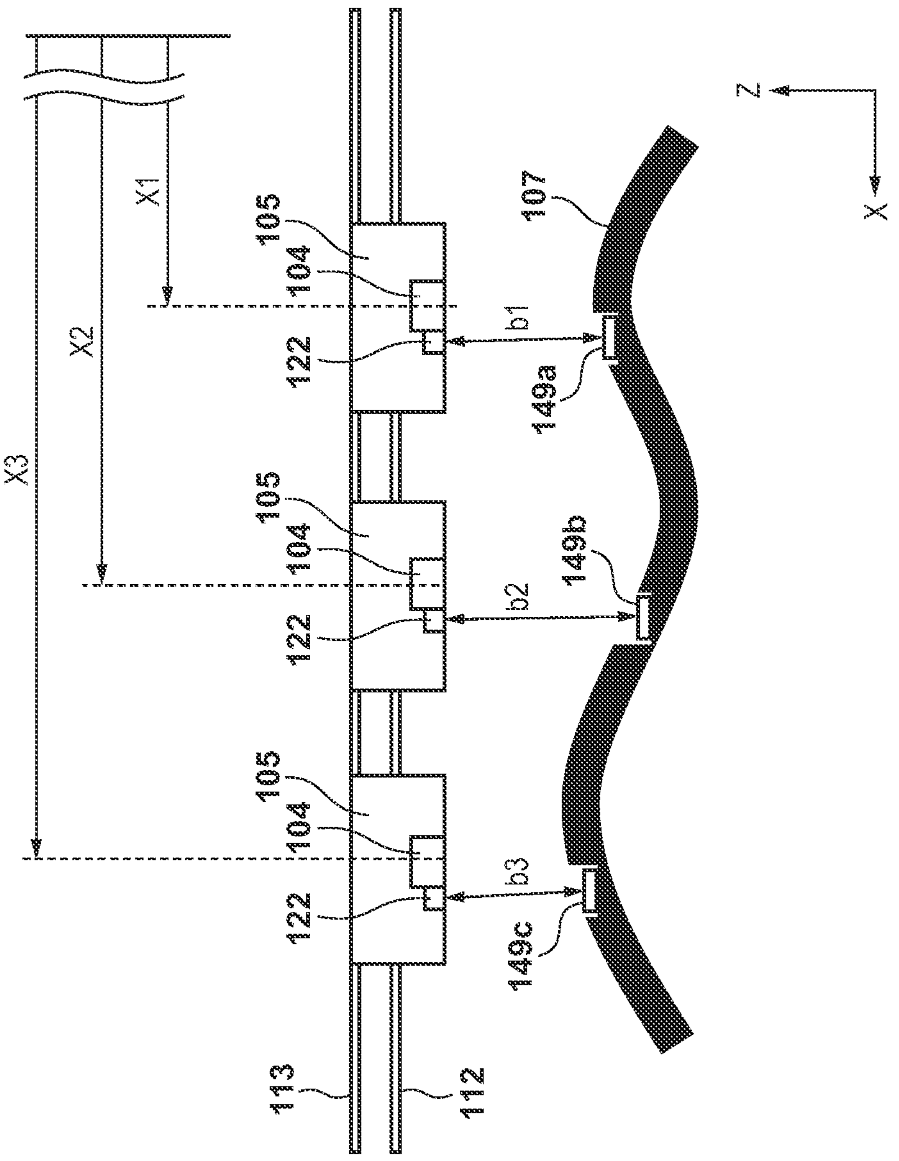
FIG. 13A is a schematic front view showing a state in which a multi-sensor performs light emission/reception for platen patches in the printing apparatus according to one embodiment.

Next, measurement of the platen patches 149 by the multi-sensor 122 is performed. FIGS. 13A and 13B are a schematic front view and a schematic side sectional view, respectively, showing a state in which the multi-sensor 122 performs light emission/reception for the platen patches 149 in the printing apparatus 100. First, the dummy head 145 is detached from the carriage 105, and the printhead 104 is mounted on the carriage 105. The lift cams 117 are rotated by the angle θ'. Next, the carriage 105 is moved in the main scanning direction and stopped at a position where the multi-sensor 122 can perform light emission/reception for the platen patch 149 provided in the platen 107, and performs light emission/reception. Note that the stop positions need not always be the same as X(1), X(2), and X(3) described above. In this embodiment, a case in which the positions are the same will be described below.

As shown in FIG. 11, the CPU 124 stores, in the main body ROM 125, light receiving amounts b1, b2, and b3 of the multi-sensor 122 for platen patches 149*a*, 149*b*, and 149*c*, respectively, in association with other parameters.

Also, as shown in FIG. 13B, the CPU 124 calculates a distance Hs(n) (n=1, 2, 3) from the printhead orifice, which is located at the same position as the installation position of the multi-sensor 122 in the sub-scanning direction, to the platen and stores the distance Hs(n) in the main body ROM 125, as shown in FIG. 11. This calculation uses a distance L1 from a most upstream side orifice 401*a* to the installation position of the multi-sensor 122 and a distance L2 from the most upstream side orifice 401*a* to a position 401*b* of the most downstream side orifice, which are stored in the main body ROM 125 in advance as design values in the sub-scanning direction. That is, using the upstream-side HP distance Hu(n)' and the downstream-side HP distance Hd(n)' described above, Hs(n) can be expressed by $$Hs(n)=(L2x\ Hu(n)'+L1\times Hd(n)'-L1\times Hu(n)')/L2 \tag{1}$$

The calculation of Hs(1) is expressed using detailed numerical value examples. If L1=0.2 mm, and L2=2 mm, $$\begin{aligned} Hs(1) &= (2\times 3.8+0.2\times 3.9)-0.2\times 3.8)/2 \\ &= 3.81\ \text{mm} \end{aligned} \tag{2}$$

The CPU 124 performs similar calculations for Hs(2) and Hs(3), and stores these values in the main body ROM 125. These are various kinds of adjustment steps of the printing apparatus performed on a production site such as a factory. With these steps, when the printing apparatus 100 is shipped from the production site, the parameters shown in FIG. 11 are stored in the main body ROM 125.

(3) Adjustment Step at Time of Use by User

Figure 14:
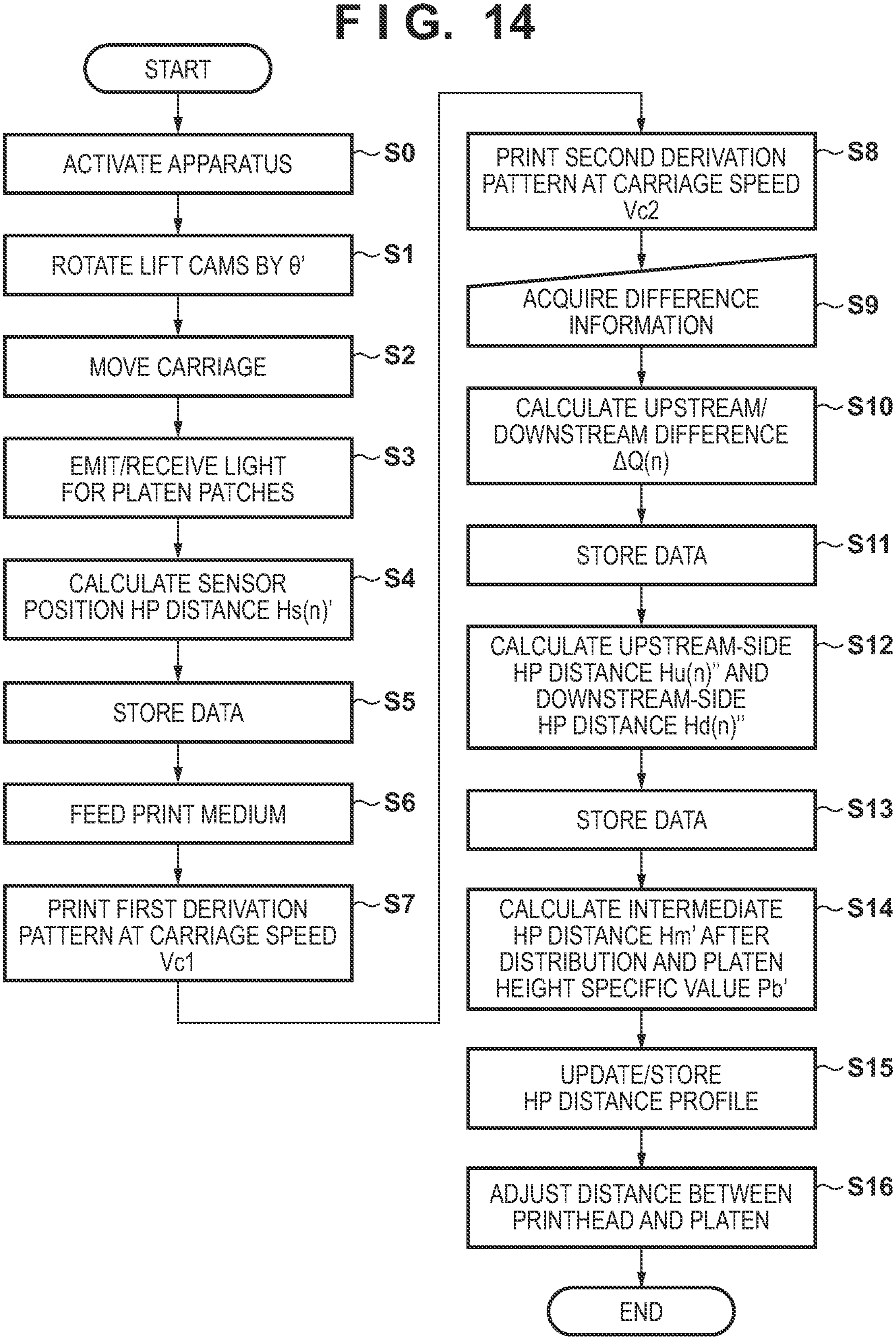
FIG. 14 is a flowchart showing an adjustment operation at the time of use by a user according to one embodiment.
Figure 15B:
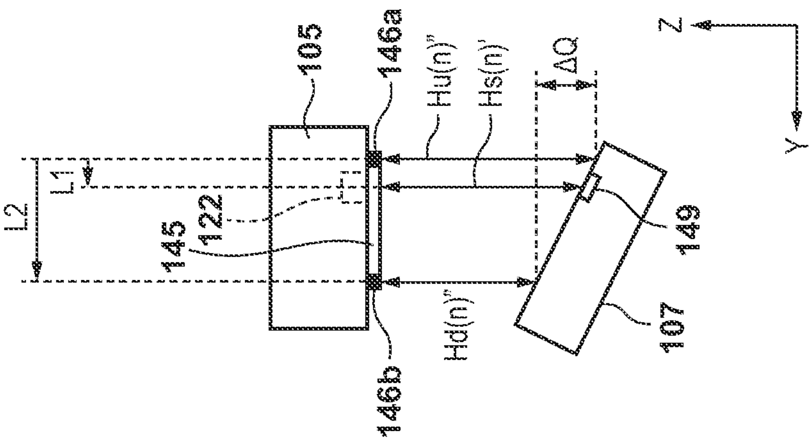
FIG. 15B is a schematic sectional view showing the state around the carriage and the platen after arrival according to one embodiment.
Figure 15A:
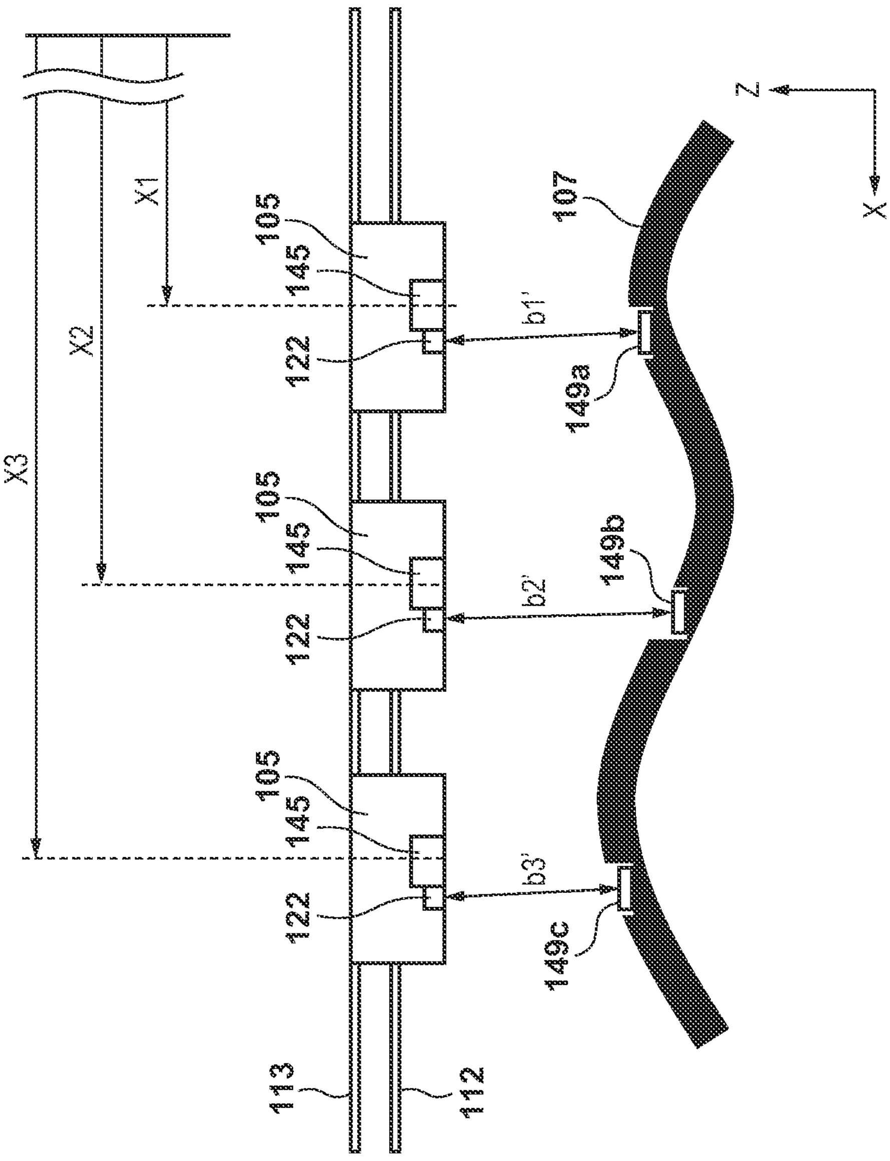
FIG. 15A is a schematic front view showing a state around the carriage and the platen after arrival according to one embodiment.

An adjustment operation performed when the printing apparatus 100 has arrived at the user will be described next. FIG. 14 is a flowchart showing the adjustment operation at the time of use by the user, and shows an example of processing of performing correction for the HP distance that has varied due to product conveyance or the like. For example, this flowchart starts based on power-on of the printing apparatus 100 after the printing apparatus 100 has arrived at the user. FIGS. 15A and 15B are a schematic front view and a schematic sectional view, respectively, showing the state around the carriage 105 and the platen 107 after arrival.

In some cases, during the time until the printing apparatus 100 arrives at the user from the production site such as a factory, the HP distance varies due to the influence of a vibration or an impact at the time of conveyance. An adjustment operation in a case in which the HP distance has varied will be described below.

(S0 to S5: Acquisition of HP Distance Hs(n)' at Installation Position of Multi-Sensor 122)

In step S0, based on power-on of the printing apparatus 100, the CPU 124 activates the apparatus. In step S1, the CPU 124 controls the lift motor 121 to rotate the lift cams 117 by the angle θ'. In this embodiment, θ' is 23° acquired at the time of factory adjustment. In step S2, the CPU 124 causes the carriage motor driving circuit 128 to move the carriage 105. In step S3, the CPU 124 causes the multi-sensor 122 to perform light emission/reception for the platen patches 149*a*, 149*b*, and 149*c* at positions X1, X2, and X3. Note that in this embodiment, the multi-sensor 122 configured to detect an end portion of the print medium 101 performs light emission/reception for the platen patches 149*a*, 149*b*, and 149*c*. However, a sensor provided independently of the multi-sensor 122 may be used.

In step S4, the CPU 124 compares light receiving amounts b' 1, b'2, and b'3 detected by the multi-sensor 122 in step S3 with the light receiving amounts b1, b2, and b3 at the time of factory adjustment, which are stored in the main body ROM 125, and acquires the differences between the light receiving amounts. That is, the CPU 124 acquires "b'1-*b*1", "b'2-*b*2", and "b'3-*b*3". The difference between the light receiving amounts can be replaced with the difference between the HP distances using the relationship between the sensor light receiving amount and the HP distance as shown in FIG. 8. More specifically, the CPU 124 performs an operation of adding a value corresponding to the difference between the HP distances based on the difference between the light receiving amounts to Hs(n) stored in the main body ROM 125. Accordingly, the distance Hs(n)' from the nozzle surface 104*a* to the platen after distribution (after the arrival at the user) at the same position as the installation position of the multi-sensor 122 in the sub-scanning direction is obtained.

Note that in this embodiment, the distance Hs(n)' is obtained based on the difference between the currently detected light receiving amount and the light receiving amount at the time of factory adjustment, which is stored in the main body ROM 125, and Hs(n). However, the CPU 124 may obtain correlation data between the light receiving amount and the sensor position HP distance Hs(n) by, for example, linearly interpolating the relationship between the light receiving amounts b1 to b3 and the sensor position HP distance Hs(n) shown in FIG. 11. Then, the CPU 124 may calculate the sensor position HP distance Hs(n)' based on the correlation data and the light receiving amounts b' 1, b'2, and b'3 in step S2. That is, the CPU 124 may acquire the sensor position HP distance Hs(n)' directly based on the detection result of the multi-sensor 122 without calculating the differences between the light receiving amounts b1 to b3 and the light receiving amounts b'1 to b'3.

In step S5, the CPU 124 stores the obtained distance Hs(n)' in the main body ROM 125 in association with other parameters. FIG. 16 shows parameters stored in the main body ROM 125 at the time of arrival at the user.

(S6 to S13: Acquisition of Upstream-Side HP Distance Hu(n)" and Downstream-Side HP Distance Hd(n)")

A method of deriving an upstream/downstream difference ΔQ between the printhead 104 and the print medium 101 after distribution, which is the difference between the upstream-side HP distance Hu(n)" and the downstream-side HP distance Hd(n)" after distribution, to obtain these distances, as shown in FIG. 15B, will be described next. Derivation of the upstream/downstream difference ΔQ is performed based on a print result by ink discharged from an upstream-side nozzle of the printhead 104 and ink discharged from a downstream-side nozzle. Also, in this embodiment, the upstream/downstream difference ΔQ is derived using the print result of a derivation pattern 14 (pattern image) (to be described later) on the print medium 101.

A tilt of the carriage 105 and the influence of the upstream/downstream difference ΔQ on printing, which are basic concepts in constituting the derivation pattern 14, will be described first with reference to FIGS. 17, 18A, and 18B.

Figure 17:
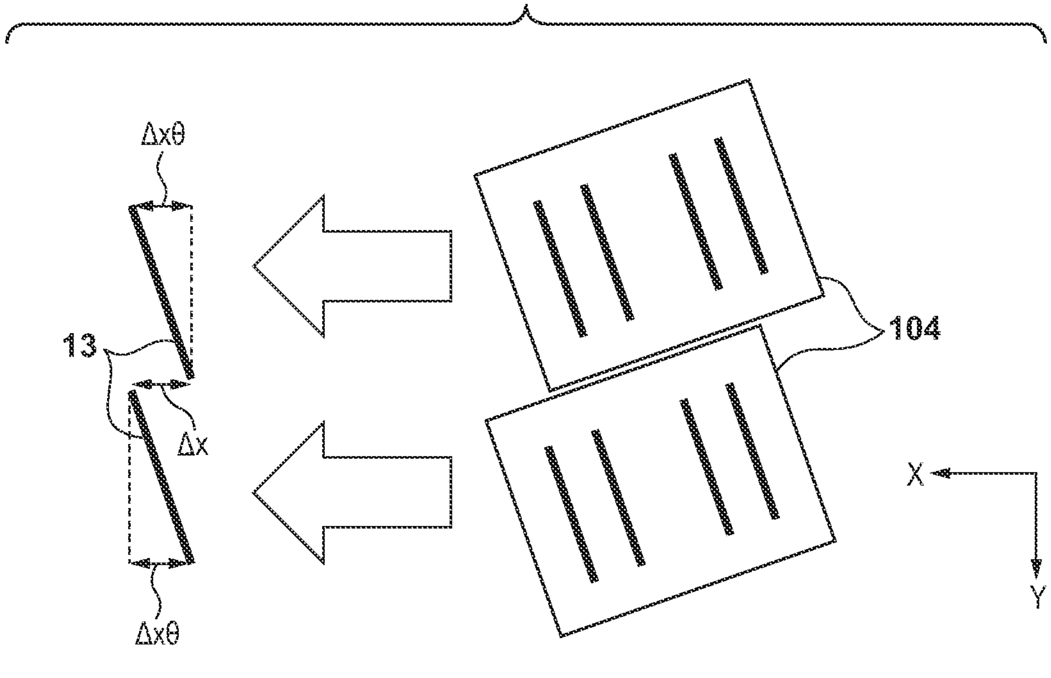
FIG. 17 is a view showing a print result only by a carriage forward operation in a case in which a slant exists according to one embodiment.

FIG. 17 shows a print result only by a carriage forward operation (to be referred to as one-way printing hereinafter) in a case in which the upstream/downstream difference ΔQ is absent, and a tilt (to be referred to as a slant hereinafter) on the nozzle surface of a printhead nozzle array with respect to the print medium conveyance direction exists. When one-way printing is repeated, a print deviation Δxθ by the slant appears as a printed image at the joint of ruled lines 13. The print deviation Δxθ is the amount of the main scanning direction deviation of the upstream-side nozzle and the downstream-side nozzle of the printhead 104 in the sub-scanning direction.

Figure 18A:
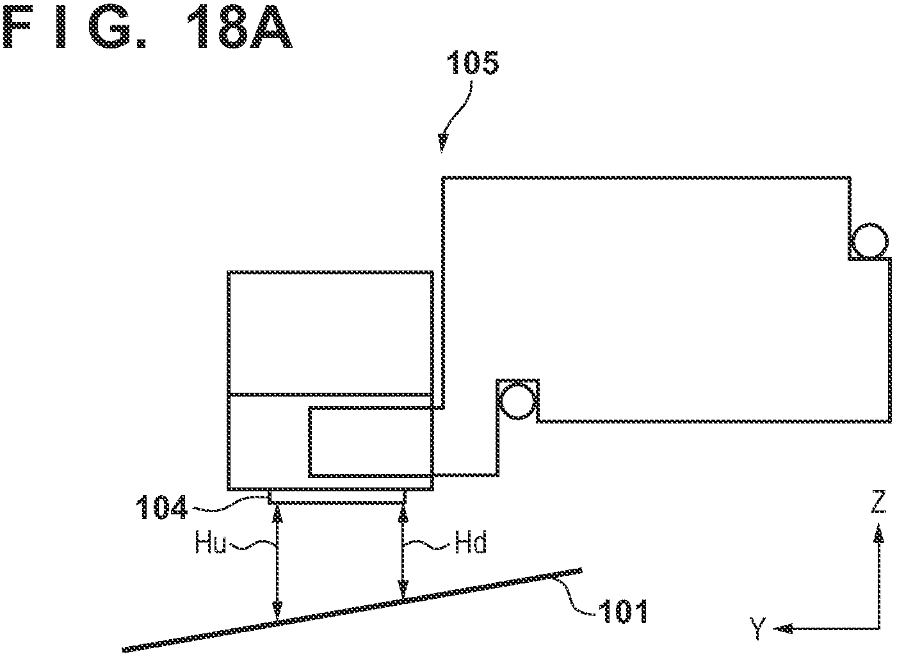
FIG. 18A is a view showing a print deviation in a case in which a slant is absent, and an upstream/downstream difference exists according to one embodiment.
Figure 18B:
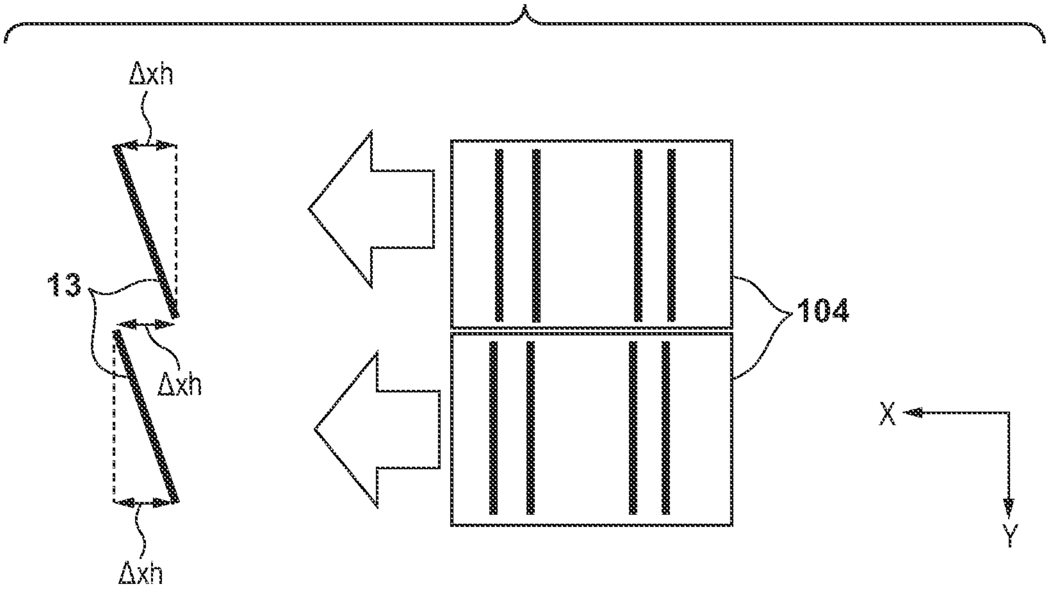
FIG. 18B is a view showing a print deviation in a case in which a slant is absent, and an upstream/downstream difference exists according to one embodiment.

FIGS. 18A and 18B show a print deviation Δxh in a case in which a slant is absent, and the upstream/downstream difference ΔQ exists. Let Hu be the upstream-side distance between the printhead 104 and the print medium 101, Hd be the downstream-side distance between the printhead 104 and the print medium 101, ΔQ be the upstream/downstream difference, Vc be the scan speed of the carriage 105, and Vi be the ink discharge speed. In this case, the print deviation Δxh is generated between ink discharged from the upstream-side nozzle of the printhead 104 and ink discharged from the downstream-side nozzle.

$$AQ=Hu-Hd \tag{3}$$

$$xh=\Delta Q/Vi\times Vc \tag{4}$$

That is, the print deviation Δxh by the upstream/downstream difference ΔQ appears as a printed image at the joint of the ruled lines 13. As an example, if Hu=1 mm, Hd=1.3 mm, Vc=2000 mm/s, and Vi=10000 mm/s, Δxh in one-way printing by the carriage 105 is given by $$\begin{aligned}\Delta xh &= (1-1.3)/10000\times 2000 \\ &= -0.06\text{ mm} \\ &= -60\ \mu\text{m}\end{aligned} \tag{5}$$

At this time, as shown in FIGS. 18A and 18B, the print position of the downstream-side nozzle is shifted to the right side (the—direction of the X-axis) by 60 μm with respect to the print position of the upstream-side nozzle.

As described above, when one-way printing is performed in a case in which the slant and the upstream/downstream difference ΔQ exist, Δxθ by the slant and Δxh by the upstream/downstream difference ΔQ are added and appear as a deviation Δx on a printed image. The deviation Δx is called a ruled line deviation. In this embodiment, the derivation pattern 14 is printed on the print medium 101 at two carriage speeds, and the amount of the ruled line deviation Δx that appears on the printed image is used, thereby acquiring the upstream/downstream difference ΔQ.

Figure 19:
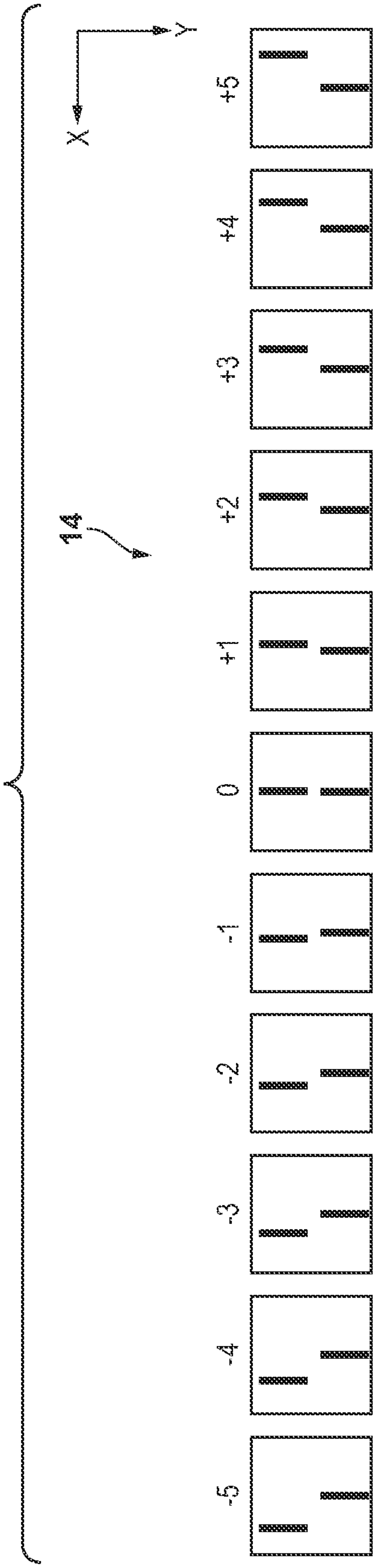
FIG. 19 is a view for explaining the outline of a derivation pattern according to one embodiment.
Figure 20:
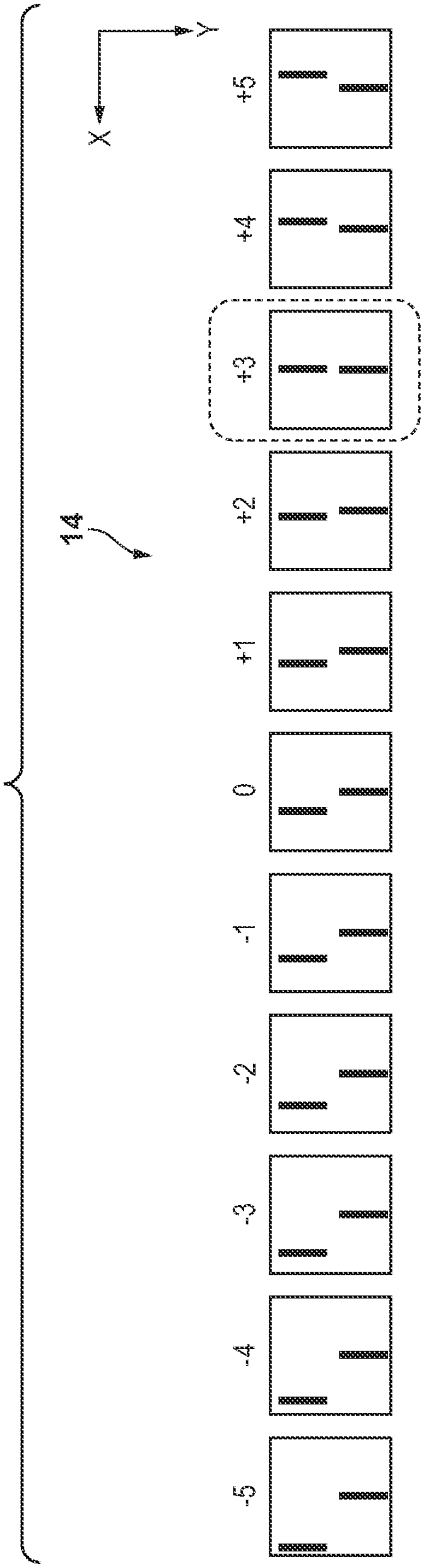
FIG. 20 is a view for explaining the outline of a derivation pattern according to one embodiment.

The derivation pattern 14 will be described with reference to FIGS. 19 and 20. FIG. 19 is a view for explaining the outline of the derivation pattern 14 and shows a state in which no ruled line deviation has occurred. FIG. 20 is a view for explaining the outline of the derivation pattern 14 and shows a state in which a ruled line deviation has occurred.

The derivation pattern 14 is formed by combination of 11 types of ruled lines. Numerical values −5, −4, −3, −2, −1, ±0, +1, +2, +3, +4, and +5 are given while defining the right side as the + direction and the left side as the—direction. The ruled lines of the lower half of the derivation pattern 14 are printed using the upstream-side nozzle in the print medium conveyance direction by the first scan of the carriage 105. The ruled lines of the upper half are printed using the downstream-side nozzle in the print medium conveyance direction by the second scan of the carriage 105. To prevent a print deviation in the two directions of the carriage 105, the derivation pattern 14 is printed only in the forward direction.

In the derivation pattern 14, the interval between the ruled lines of the upper half is set wider by 20 μm than the interval between the ruled lines of the lower half. Hence, in the example shown in FIG. 19, the ruled lines of the upper half are printed while being shifted to the right side in the main scanning direction by 20 μm from 0 to the right. In addition, the ruled lines of the upper half are printed while being shifted to the left side in the main scanning direction by 20 μm from 0 to the left. That is, when the left side is defined as— (negative), and the right side as +(positive), in the ruled lines of the upper half, the ruled line at −5 is printed at a position shifted by −100 μm with respect to the position ±0, and the ruled line at +5 is printed at a position shifted by +100 If there is no print deviation, the ruled lines of the upper half and the ruled lines of the lower half match at the position ±0. Since the upper and lower ruled lines are printed while being shifted stepwise, a portion where the ruled lines of the upper half and the lower half of an actual print result match represents the ruled line deviation amount Δx. For example, if the derivation pattern 14 is printed, and the position where the ruled lines match is 0, as shown in FIG. 19, the ruled line deviation amount Δx=0 If the position where the ruled lines match is +3, as shown in FIG. 20, the ruled line deviation amount Δx=60 In this way, the ruled line deviation Δx is acquired from the derivation pattern 14.

Figure 21:
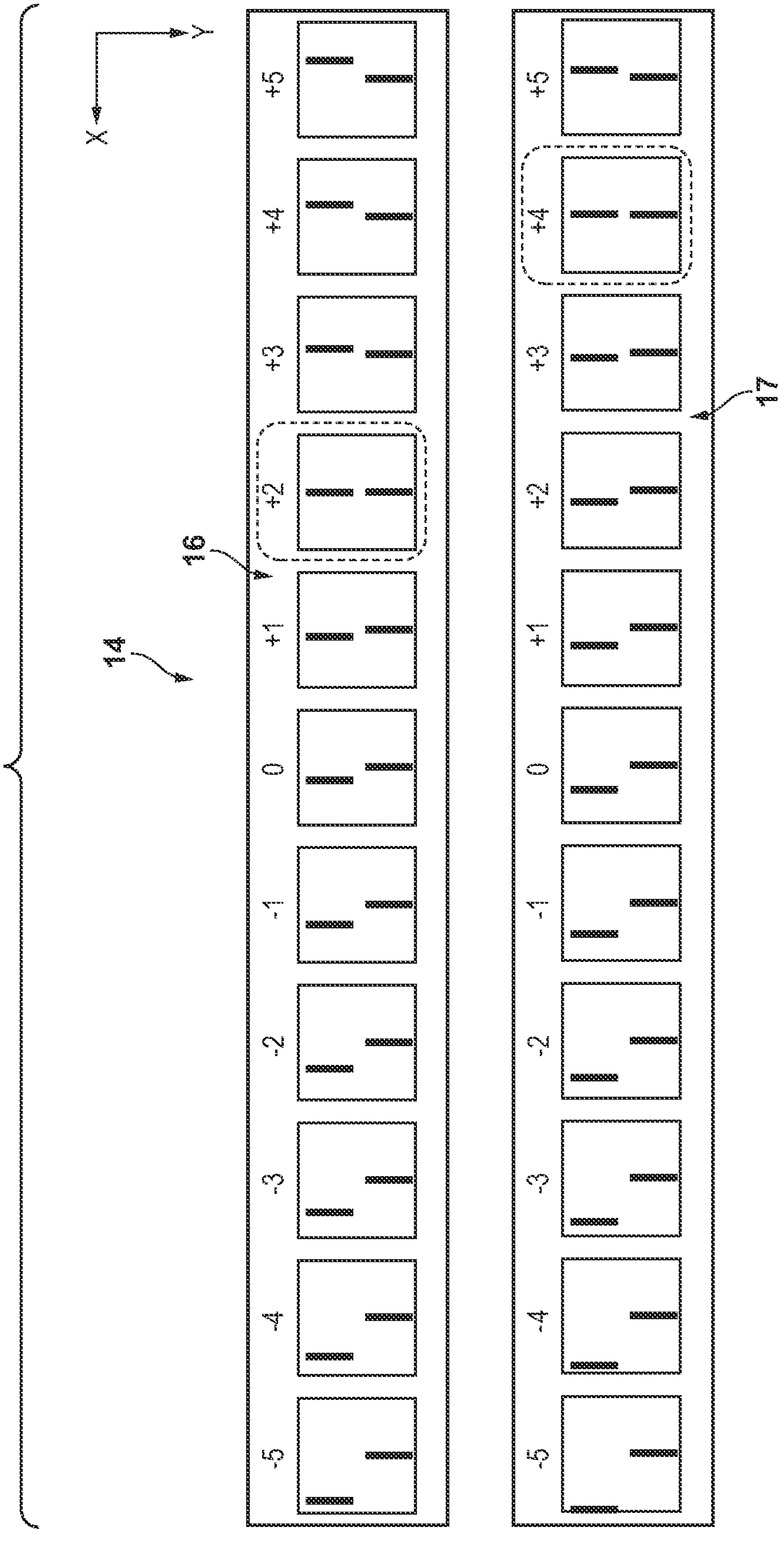
FIG. 21 is an explanatory view showing an example of the derivation pattern according to one embodiment.

The processing procedure of the upstream-side HP distance Hu(n)" and the downstream-side HP distance Hd(n)" using the derivation pattern 14 will be described next with reference to FIGS. 14, 15, and 21. FIG. 21 is an explanatory view showing an example of the derivation pattern 14.

In step S6, the CPU 124 drives, for example, rollers for conveyance and executes feed of the print medium 101. In step S7, the CPU 124 prints a first derivation pattern 16 by the printhead 104 while moving the carriage 105 at a carriage speed Vc1. Next, in step S8, the CPU 124 prints a second derivation pattern 17 by the printhead 104 while transferring the carriage 105 at a carriage speed Vc2 different from the carriage speed Vc1.

Figure 25:
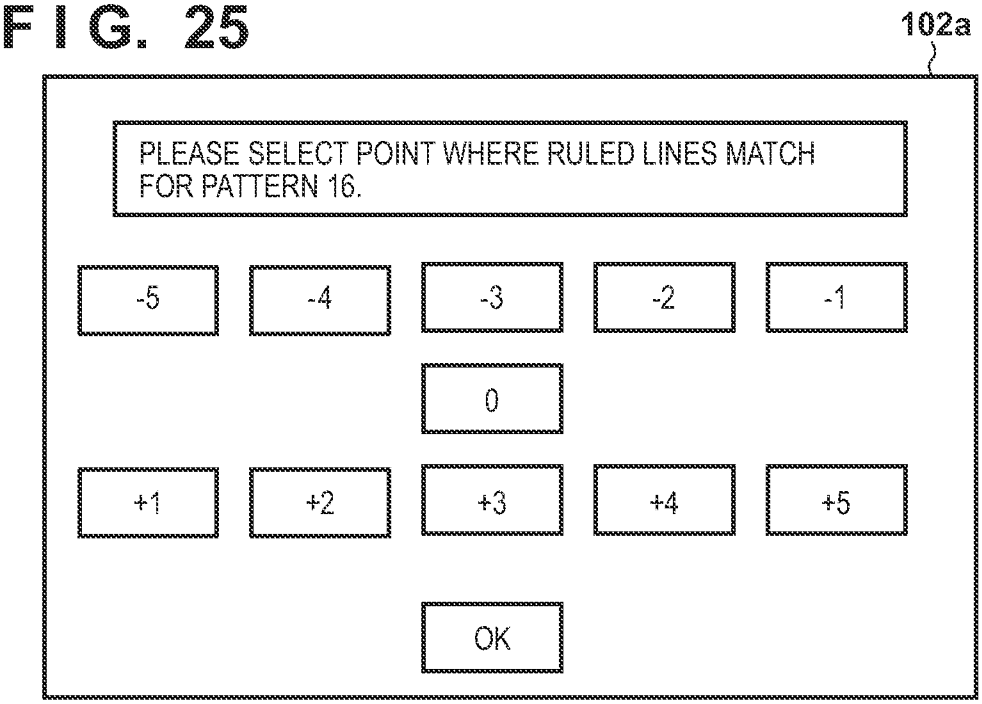
FIG. 25 is a view showing an example of display of a display unit according to one embodiment.

Next, in step S9, the CPU 124 acquires difference information concerning the difference of the distance between the platen 107 and each of the upstream-side nozzle and the downstream-side nozzle. More specifically, the CPU 124 accepts input, by the user, of a point where the ruled lines match. That is, in this embodiment, the difference information is information about a point where the ruled lines match. For example, the user selects a point where the ruled lines of each derivation pattern match and inputs it on the operation panel 102. Since the point where the ruled lines match is input by the user viewing the print result by the printhead 104, it can be said that the difference information is information based on the print result of the printhead 104. FIG. 25 is a view showing an example of display of the display unit 102*a* when the user inputs a point where the ruled lines of each derivation pattern match. In this embodiment, the operation panel 102 functions as an accepting unit for the input information from the user. The CPU 124 accepts input of both the derivation pattern 16 and the derivation pattern 17 via the operation panel 102. In the example shown in FIG. 21, the user inputs+2 for the derivation pattern 16 and +4 for the derivation pattern 17. Note that the acceptance mode of the input information from the user is not limited to this. For example, the CPU 124 may accept the input information by receiving the information from a host PC or an information processing terminal such as a smartphone or a tablet via a communication interface (not shown).

As described above, the points input by the user represent print deviation amounts Δx1 and Δx2 at the carriage speeds Vc1 and Vc2. At this time, letting Δxθ be the print deviation by the slant, ΔQ be the upstream/downstream difference between sheets, and Vi be the ink discharge speed, the print deviation amounts Δx1 and Δx2 at the carriage speeds can be expressed as $$\Delta x1=\Delta x\theta+\Delta Q/Vi\times Vc1 \tag{6}$$

$$\Delta x2=\Delta x\theta+\Delta Q/Vi\times Vc2 \tag{7}$$

Since the print deviation amounts Δx1 and Δx2 are obtained by the derivation pattern print result, ΔQ can be derived by $$\Delta Q=(Ax1-Ax2)\times Vi/(Vc1-Vc2) \tag{8}$$

In step S10, the CPU 124 calculates the upstream/downstream difference ΔQ of the printing apparatus 100 by equations (6) to (8). In this way, the CPU 124 can calculate the upstream/downstream difference ΔQ from the print deviation amounts Δx1 and Δx2 based on the difference information acquired by accepting the input from the user.

Figure 22:
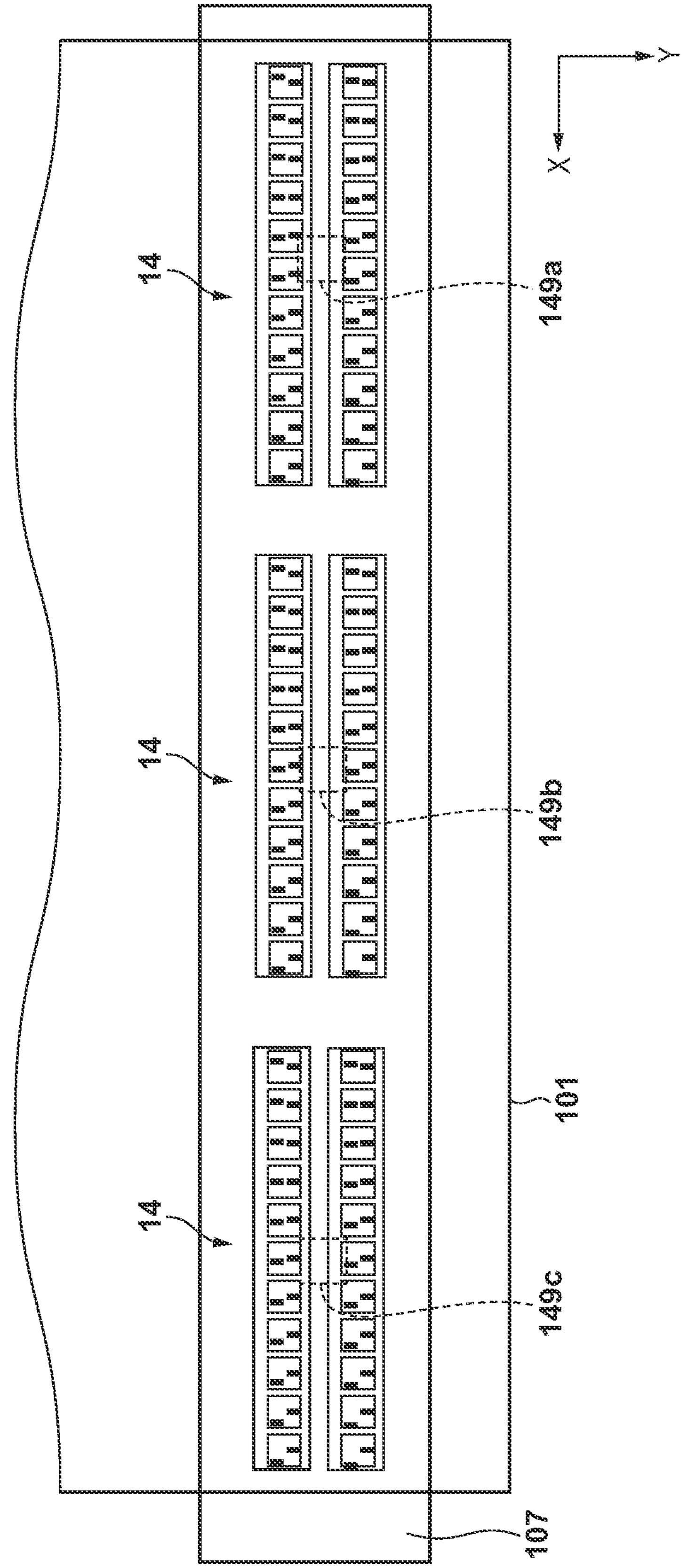
FIG. 22 is a view for explaining an example of a method of printing a derivation pattern 14 on a print medium according to one embodiment.

FIG. 22 is a view for explaining an example of a method of printing the derivation pattern 14 on the print medium 101. Note that in this embodiment, as shown in FIG. 22, the derivation pattern 14 is printed, in correspondence with the platen patches 149*a*, 149*b*, and 149*c*, on the print medium 101 in three portions near these. That is, pattern images each including two, upper and lower patterns are printed at different conveyance speeds in a plurality of ranges different from each other in the main scanning direction (widthwise direction) of the printhead 104. The user performs input of two, upper and lower patterns for each derivation pattern 14 six times in total. Hence, an upstream/downstream difference ΔQ(n) (n=1, 2, 3) corresponding to the vicinity of the measurement position of each of the previously obtained distances Hs(n)' is derived.

As a detailed example of calculation of the upstream/downstream difference ΔQ(n), a case in which ΔQ(1) is obtained for a pattern printed near the platen patch 149*a* will be described. Assuming that Vc1=300 mm/s, Vc2=2600 mm/s, and Vi=10000 mm/s, if the position where the ruled lines of the first derivation pattern 16 printed at Vc1 match is +2, and the position where the ruled lines of the second derivation pattern 17 printed at Vc2 match is +4, the upstream/downstream difference ΔQ(1) between sheets is obtained as $$\begin{aligned}\Delta Q(1)&=(0.04-0.08)\times 10000/(300-2600)\\&=(0.08\times 300-0.04\times 2600)/(300-2600)\\&\approx 0.17\ (\text{mm})\\&=170\ (\mu\text{m}))\end{aligned} \tag{9}$$

In step S11, the CPU 124 stores the derived upstream/downstream difference ΔQ(n) (n=1, 2, 3) in the main body ROM 125 in association with other parameters (see FIG. 16).

In step S12, the CPU 124 obtains the upstream-side HP distance Hu(n)" and the downstream-side HP distance Hd(n)" after distribution using the upstream/downstream difference ΔQ(n) obtained above. Also, in step S13, the CPU 124 stores the obtained values in the main body ROM 125 in association with other parameters, as shown in FIG. 16. More specifically, the CPU 124 obtains the upstream-side HP distance Hu(n)" and the downstream-side HP distance Hd(n)" based on the relationship shown in FIG. 14 by $$Hu(n)''=L1\times\Delta Q(n)/L2+Hs(n)' \quad (10)$$

$$Hd(n)''=Hu(n)''-\Delta Q(n) \quad (11)$$

For example, an example in which Hu(1)" and Hd(1)" are obtained will be described. As described above, since L1=0.2 mm, and L2=2 mm, $$Hu(1)''=0.2\times0.17/2+3.223.24\text{ mm} \quad (12)$$

$$Hd(1)''=3.24-0.17=3.07\text{ mm} \quad (13)$$

Hu(2)", Hd(2)", Hu(3)", and Hd(3)" can also be obtained in the same way.

(S14 and S15: Calculation of Intermediate HP Distance Hm' and Platen Height Specific Value Pb' after Distribution)

In step S14, the CPU 124 obtains a half the sum of the maximum value and the minimum value of Hd(n)" and Hu(n)" as an intermediate HP distance Hm' after distribution, and obtains a platen height specific value Pb' after distribution for the ideal distance H.

In this embodiment, the intermediate HP distance Hm'(θ')=(3.8+2.95)/2=3.375. This is the distance at a lift cam rotation angle θ'=23°. Hence, when the tilt of the lift cam profile is taken into consideration, the intermediate HP distance Hm'(θ) at the lift cam rotation angle θ=30° is the intermediate HP distance Hm'(θ)=3.375+0.2=3.575 from FIG. 12. Hence, the platen height specific value Pb' after distribution is Pb'=3.575-4=−0.425. The CPU 124 stores the calculated platen height specific value Pb' in the main body ROM 125.

Figure 23:
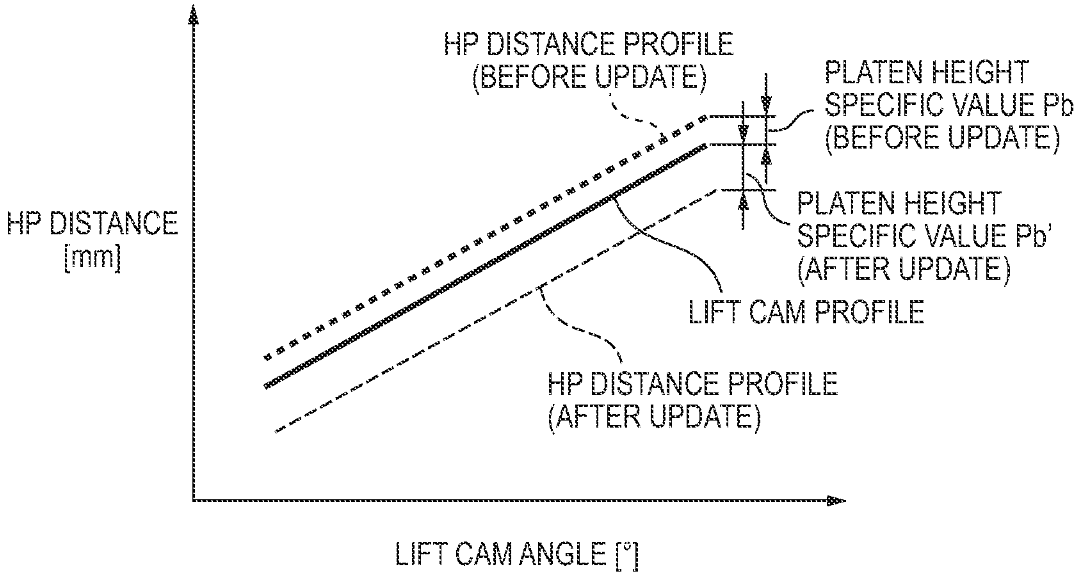
FIG. 23 is a conceptual view of HP distance profiles before and after platen height specific value updating according to one embodiment.

In step S15, the CPU 124 updates the HP distance profile, finally creates a new HP distance profile, and stores it in the main body ROM 125. FIG. 23 is a conceptual view of HP distance profiles before and after platen height specific value updating after the printing apparatus 100 has arrived at the user (after distribution). When the lift cam profile is offset to the lower side by an amount corresponding to the platen height specific value Pb', the HP distance for a lift cam angle on data can be made to match the actual HP distance.

(S16: Adjustment of HP Distance by Adjustment Unit)

In step S16, the CPU 124 adjusts the distance between the printhead 104 and the platen 107. More specifically, the CPU 124 rotates the lift cams 117 by the lift motor 121. Furthermore, the CPU 124 executes adjustment of the HP distance by the adjustment unit 12 based on the HP distance profile stored in step S15 such that the HP distance equals the design value. The adjustment operation of the HP distance, which is performed when the printing apparatus has arrived at the user, is thus completed.

As described above, according to this embodiment, the setting of the HP distance profile after the arrival at the user is done based on the detection result of the multi-sensor 122 and the difference information concerning the difference of the distance between the platen 107 and each of the upstream-side nozzle and the downstream-side nozzle. It is therefore possible to suppress lowering of ink landing accuracy caused by the upstream/downstream difference ΔQ and improve the print quality of the printing apparatus 100 capable of adjusting the distance between the printhead 104 and the print medium 101.

In some cases, during the distribution stage from the production site to the use place of the user, a deformation or the like may occur in the printing apparatus 100 due to a vibration or an impact that the apparatus has received, and the distance between the printhead 104 and the print medium 101 including the upstream/downstream difference ΔQ may vary. In this embodiment, however, even if such a variation has occurred, the relationship between the lift cam angle and the HP distance in control can be corrected based on the change amount of the HP distance at the sensor position, which is detected by the multi-sensor 122, and the upstream/downstream difference ΔQ by the derivation pattern 14. It is therefore possible to accurately maintain the HP distance between the printhead 104 and the print medium 101 even after distribution and maintain/improve the quality of a printed image.

Note that in this embodiment, when obtaining the upstream/downstream difference ΔQ, the user is caused to input a point where the ruled lines match. Another mode can also be employed. That is, the difference information concerning the difference of the distance between the platen 107 and each of the upstream-side nozzle and the downstream-side nozzle, which is used to obtain the upstream/downstream difference ΔQ, may be acquired by another mode. For example, it is possible to employ a mode without interposing the user in which a printed pattern is detected by an image sensor or the like, and the upstream/downstream difference ΔQ is acquired based on the detection result. For example, a plurality of adjustment patterns may be printed in an overlap state while changing the print timing of the nozzle array of the uppermost stage stepwise with respect to printing of the nozzle array of the lowermost stage of the print nozzle array as a reference, and the density may be determined by detecting the pattern by a sensor or the like. That is, the difference information may be information based on the detection result of the sensor for the print result by the printhead 104, such as the result of density determination.

In this embodiment, distance measurement after distribution is performed by the multi-sensor 122, and after that, the derivation pattern for deriving the upstream/downstream difference ΔQ is printed subsequently. However, the present invention is not limited to this configuration. For example, after the distance measurement after distribution by the multi-sensor 122, the HP distance profile may be updated based on the difference from the detection result of the multi-sensor 122 before shipping using only the result, and the adjustment operation itself may be ended temporarily. Then, the operation of deriving the upstream/downstream difference ΔQ may be executed at the time of execution of a print job or at an arbitrary timing of the user.

Also, in this embodiment, after the intermediate HP distance Hm' and the platen height specific value Pb' after distribution are calculated, and the result is stored in the main body ROM 125, adjustment by the adjustment unit 12 is executed. Another mode can also be employed. For example, the intermediate HP distance Hm' and the platen height specific value Pb' after distribution may be stored in the main body ROM 125, and then, the adjustment operation may temporarily be ended. Then, adjustment by the adjustment unit 12 may be executed at the time of execution of a print job or the like.

In addition, updating of the HP distance profile may be executed not only after the arrival at the user but as needed. For example, updating of the HP distance profile may be executed at a timing at which the printing apparatus 100 should execute updating of the HP distance profile as instructed by the user via the operation panel 102. Alternatively, updating of the HP distance profile may be performed periodically.

Alternatively, the upstream/downstream difference ΔQ may be acquired during execution of a print job, and the HP distance profile may be updated every time. For example, a pattern may be printed on a marginal portion of the print medium 101 or the like, the pattern may be detected by a sensor by the above-described method or the like, and the HP distance profile may be updated based on the upstream/downstream difference ΔQ acquired based on the detection result. The pattern in this case is not limited to a pattern visualized such that a human can visually perceive. If the upstream/downstream difference ΔQ is acquired during execution of a print job, the difference information concerning the difference of the distance between the platen 107 and each of the upstream-side nozzle and the downstream-side nozzle may be acquired from the print result of the print data itself.

Also, in this embodiment, the HP distance profile set at the time of factory adjustment is updated after arrival at the user. A configuration in which the HP distance profile is not set at the time of factory adjustment can also be employed. For example, at the time of factory adjustment, the lift cam profile and the relationship of the sensor position HP distance Hs(n) with respect to the light receiving amount of the multi-sensor 122 may be stored in the main body ROM 125. After arrival at the user, the HP distance profile may be set based on the information stored in the main body ROM 125, the light receiving amount of the multi-sensor 122 after the arrival, and the above-described difference information.

Second Embodiment

The second embodiment is different from the first embodiment mainly in that before a print job is executed, the HP distance profile is set in accordance with a size in the widthwise direction of a print region. More specifically, in the first embodiment, the intermediate HP distance Hm is calculated from the whole printable region of the printing apparatus 100 in the main scanning direction. The platen height specific value Pb' after distribution is obtained such that the difference from the ideal distance H becomes small in the whole region, and the HP distance profile is adjusted based on this. This is particularly effective when the width of the print medium 101 for which printing is executed is close to the width of the whole printable region. On the other hand, in the second embodiment, the method of calculating the platen height specific value after distribution is changed in accordance with the width of the print region in a job to be executed, and the HP distance profile is optimized in accordance with the print medium width.

Figure 24:
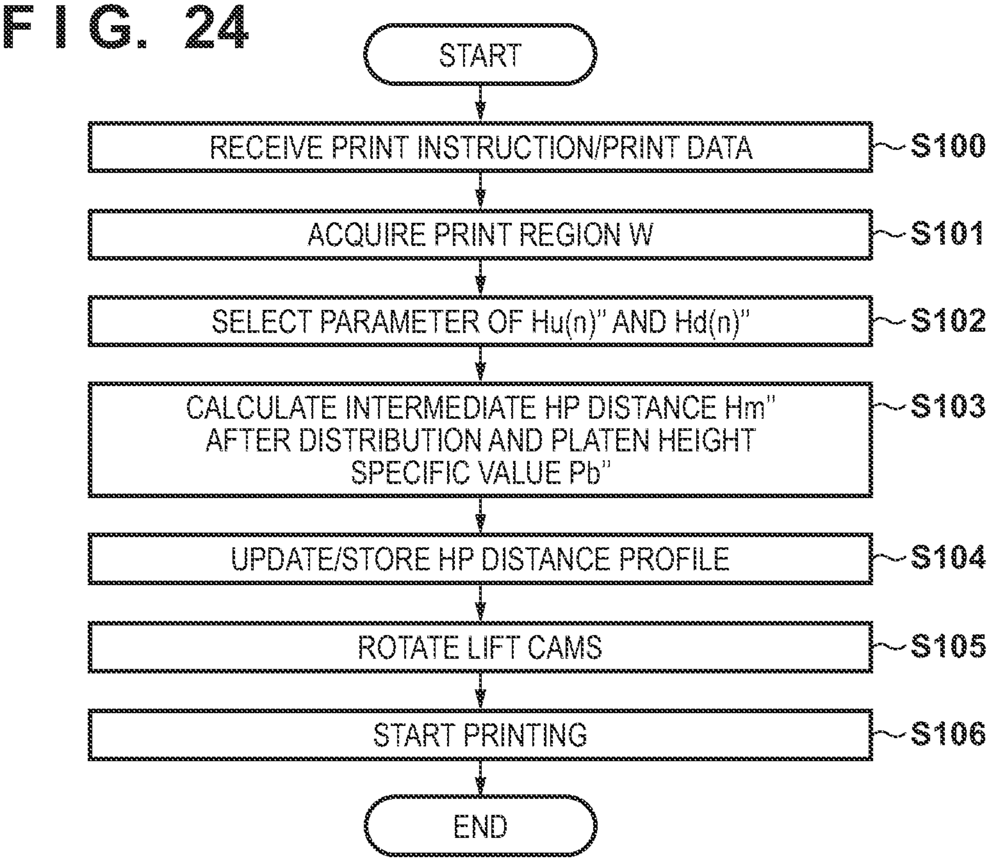
FIG. 24 is a flowchart showing an adjustment operation at the time of use by a user according to one embodiment.

FIG. 24 is a flowchart showing an adjustment operation at the time of use by a user according to the embodiment. This operation procedure is executed, for example, after the operation procedure shown in FIG. 14 is completed, and the HP distance profile is updated. FIGS. 15, 16, and 23 will also be referred to as needed in the following description. The same reference numerals as in the first embodiment denote the same parts hereinafter, and a description thereof will be omitted.

In step S100, a CPU 124 receives a print instruction and print data from a host PC or the like by a user operation via a communication interface (not shown).

In step S101, the CPU 124 acquires information of a print region Win the main scanning direction from the received print data. Here, the print region W represents a coordinate defined by setting an end position of a print medium 101 to 0, like X(n).

In step S102, the CPU 124 selects a parameter to be used from Hu(n)" and Hd(n)" that are parameters stored in the main body ROM shown in FIG. 16 in accordance with the numerical value of the print region W. A detailed example will be described. Based on the information of a carriage position X(n), if the print region W is 0 mm or more and less than 750 mm that is the intermediate value between X(1) and X(2), the pieces of information of Hu(1)" and Hd(1)" are selected. If the print region W is 750 mm or more and less than 1,250 mm that is the intermediate value between X(2) and X(3), the pieces of information of Hu(1)“, Hd(1)”, Hu(2)“, and Hd(2)” are selected. If the print region W is 1,250 mm or more and less than 1,500 mm, the pieces of information of Hu(1)“, Hd(1)”, Hu(2)“, Hd(2)”, Hu(3)“, and Hd(3)” are selected. That is, in accordance with the print region W, the CPU 124 refers to only data of X(n) including the vicinity of the region, and selects the parameters Hu(n)" and Hd(n)" associated with it.

In step S103, using the selected information of Hd(n)" and Hu(n)“, the CPU 124 obtains a distance corresponding to a half of the sum of the maximum value and the minimum value as an intermediate HP distance Hm' after distribution, and obtains a platen height specific value Pb' after distribution, which is an ideal distance H. A detailed example will be described. If the print region W is 0 mm or more and less than 750 mm, Hm”=(3.24+3.07)/2≈3.16, and Pb"=3.16+0.2-4=−0.64.

In step S104, the CPU 124 updates the HP distance profile according to an HP distance variation amount by distribution, as shown in FIG. 23, finally creates a new HP distance profile, and stores it in a main body ROM 125.

In step S105, the CPU 124 rotates the angle of the lift cams by a predetermined amount based on the profile. In step S106, the CPU 124 starts printing.

In this embodiment, for example, if the print region W is 0 mm or more and 750 mm or less, Pb"=−0.64. Hence, if lift cams 117 are rotated to an angle at which the HP distance is 4.0 mm on the HP distance profile, Hu=3.24+0.64+0.2=4.08 mm, and Hd=3.07+0.64+0.2=3.91. For this reason, the error from the ideal distance H (=4 mm) is 0.09 mm at maximum.

On the other hand, in the updating method of the HP distance profile according to the first embodiment, since Pb=−0.425, Hu=3.24+0.425+0.2=3.865, and Hd=3.07+0.425+0.2=3.695. For this reason, the error from the ideal distance H (=4 mm) is 0.305 mm at maximum.

As described above, in this embodiment, parameters according to the print region W are selected, thereby further reducing the error in the distance between a printhead 104 and the print medium 101 and improving the quality of a printed image.

Note that in this embodiment, parameter selection and platen height specific value calculation are performed for each print instruction. However, another mode is also possible. For example, a plurality of platen height specific values Pb" according to the size of the print region W may be calculated and stored in the main body ROM 125 in advance, Pb" may be selected simply in accordance with the size of the print region W by a print instruction, and the subsequent adjustment operation may be performed. Alternatively, for example, the calculation of the plurality of platen height specific values Pb" may be executed when a printing apparatus 100 is powered on for the first time after it has arrived at the user.

Also, to perform finer adjustment, the values of Hu(n)" and Hd(n)" between X(n) may be obtained as a linear approximation from the data shown in FIG. 16, and the values of Hu(n)" and Hd(n)" in the print region W may be calculated and used. For example, if W=750 mm, it is the intermediate value between X(1) and X(2), and therefore, Hu"=(3.24+3.8)/2=3.52, and Hd"=(3.07+3.6)/2≈3.34. Based on these values, Hm"=(3.52+3.07)/2≈3.3, and Pb"=3.3+0.2-4=−0.5 may be obtain. It is therefore possible to perform accurate adjustment according to the print region W.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:

a printhead including a plurality of nozzles configured to discharge ink to a print medium;

a platen configured to support the print medium and including a platen patch which is provided at a position facing the printhead;

a first detection unit configured to detect a distance between the printhead and the platen by detecting the platen patch;

an acquisition unit configured to acquire information concerning a difference between a first distance between the platen and an upstream nozzle area on an upstream side of the printhead in a conveyance direction of the print medium and a second distance between the platen and a downstream nozzle area on a downstream side of the printhead in the conveyance direction, a control unit configured to cause the printing apparatus to perform a predetermined operation based on a detection result of the first detection unit and the information acquired by the acquisition unit.

2. The apparatus according to claim 1, wherein the information is information based on a print result by the printhead.

3. The apparatus according to claim 1, further comprising an acceptance unit configured to accept input by a user, wherein the information is input information input by a user to the acceptance unit based on a print result by the printhead.

4. The apparatus according to claim 1, further comprising a second detection unit configured to detect a print result by the printhead, wherein the information is information based on a detection result of the second detection unit.

5. The apparatus according to claim 1, wherein the information is information based on a first pattern image printed on the print medium by the printhead moving at a first speed and a second pattern image printed on the print medium by the printhead moving at a second speed.

6. The apparatus according to claim 1, wherein the control unit cause the printing apparatus to perform the predetermined operation in a preliminary step before a printing operation in which ink is discharged from the nozzles to the print medium to print an image on the print medium is performed.

7. The apparatus according to claim 1, wherein the platen includes a plurality of platen patches which are provided at positions facing the printhead.

8. The apparatus according to claim 1, further comprising an adjustment unit configured to adjust the distance between the printhead and the platen; and a setting unit configured to set, based on a detection result of the first detection unit and the information acquired by the acquisition unit, data that is associated with distance information about a distance between the printhead and the platen and a control parameter of the adjustment unit, wherein the predetermined operation is an adjustment operation performed by the adjustment unit based on the detection result and the information, and the adjustment unit executes adjustment of the distance between the printhead and the platen based on the data set by the setting unit.

9. The apparatus according to claim 8, wherein the distance information is an average value of the distance between the platen and at least one nozzle in the upstream nozzle area on the upstream side and the distance between the platen and at least one nozzle in the downstream nozzle area on the downstream side.

10. The apparatus according to claim 8, wherein the information is information based on a first pattern image printed on the print medium by the printhead moving at a first speed and a second pattern image printed on the print medium by the printhead moving at a second speed, the first speed and the second speed being different from each other, the printhead respectively prints the first pattern image and the second pattern image in a plurality of ranges different from each other in a widthwise direction crossing the conveyance direction of the print medium, and the setting unit sets the data based on the difference information in each of the plurality of ranges.

11. The apparatus according to claim 10, wherein the distance information is an average value of a maximum value and a minimum value of the distance between the platen and at least one nozzle in the upstream nozzle area on the upstream side and at least one nozzle in the downstream nozzle area on the downstream side in each of the plurality of ranges.

12. The apparatus according to claim 8, wherein the setting unit sets the data based on the detection result and the information according to a size of the print medium in a widthwise direction crossing the conveyance direction.

13. The apparatus according to claim 8, wherein the setting unit executes the setting of the data in accordance with power-on of the printing apparatus.

14. The apparatus according to claim 8, further comprising a storage unit configured to store the data, wherein the setting unit updates the data stored in advance in the storage unit, based on the detection result and the information.

15. The apparatus according to claim 8, further comprising a carriage including the printhead and capable of reciprocally moving in a widthwise direction of the print medium crossing the conveyance direction, wherein the adjustment unit includes a motor capable of adjusting the distance between the printhead and the platen, and the control parameter is a parameter concerning a rotation angle of the motor.

16. The apparatus according to claim 3, wherein the acceptance unit includes a display unit configured to display information used to accept input by a user.

17. A control method of a printing apparatus having a printhead including a plurality of nozzles configured to discharge ink to a print medium, the method comprising:

detecting a distance between the printhead and a platen by detecting a platen patch provided in the platen at a position facing the printhead;

acquiring information concerning a difference between a first distance between the platen and an upstream nozzle area on an upstream side of the printhead in a conveyance direction of the print medium and a second distance between the platen and a downstream nozzle area on a downstream side of the printhead in the conveyance direction; and controlling the printing apparatus so as to perform a predetermined operation based on a detection result of the detecting and the information acquired in the acquiring.

18. The method according to claim 17, wherein the information is information based on a print result by the printhead.

19. The method according to claim 17, further comprising accepting input by a user, wherein the information is input information input by a user in the accepting based on a print result by the printhead.

20. The method according to claim 17, further comprising detecting a print result by the printhead, wherein the information is information based on a detection result in the detecting the print result.

21. The method according to claim 17, wherein the information is information based on a first pattern image printed on the print medium by the printhead moving at a first speed and a second pattern image printed on the print medium by the printhead moving at a second speed.

22. The method according to claim 17, further comprising adjusting the distance between the printhead and the platen, and setting, based on a detection result in the detecting and the information acquired in the acquiring, data with which distance information between the printhead and the platen and a control parameter in the adjusting are associated, wherein the predetermined operation is an adjustment operation performed by the adjusting based on the detection result and the information, and in the adjusting, adjustment of the distance is executed based on the data set in the setting.

* * * * *